United States Patent
Usui et al.

(10) Patent No.: US 7,823,016 B2
(45) Date of Patent: Oct. 26, 2010

(54) MESSAGE ANALYZING APPARATUS, MESSAGE ANALYZING METHOD, AND COMPUTER PRODUCT

(75) Inventors: Noriko Usui, Kawasaki (JP); Masami Taoda, Kawasaki (JP); Nobuhiro Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 12/006,416

(22) Filed: Jan. 2, 2008

(65) Prior Publication Data

US 2008/0155337 A1 Jun. 26, 2008

Related U.S. Application Data

(63) Continuation of application No. PCT/JP2005/012995, filed on Jul. 14, 2005.

(51) Int. Cl.
*G06F 11/00* (2006.01)
(52) U.S. Cl. ...................................................... 714/26
(58) Field of Classification Search ............. 714/25–28, 714/31, 37–39, 45–49, 57
See application file for complete search history.

(56) References Cited

U.S. PATENT DOCUMENTS

| | | | |
|---|---|---|---|
| 5,414,645 A | | 5/1995 | Hirano |
| 5,555,191 A * | | 9/1996 | Hripcsak ................. 709/224 |
| 6,317,846 B1 * | | 11/2001 | Higgins et al. ........... 714/30 |
| 6,438,707 B1 * | | 8/2002 | Ronstrom ................. 714/13 |
| 6,496,853 B1 * | | 12/2002 | Klein ....................... 709/206 |
| 6,896,179 B2 * | | 5/2005 | Satoh et al. .............. 235/379 |
| 7,036,048 B1 * | | 4/2006 | Gill et al. ................. 714/47 |
| 7,120,685 B2 * | | 10/2006 | Ullmann et al. .......... 709/224 |
| 7,483,970 B2 * | | 1/2009 | Anuszczyk et al. ....... 709/224 |
| 7,624,177 B2 * | | 11/2009 | Desai et al. .............. 709/224 |
| 2003/0009271 A1 | | 1/2003 | Akiyama |
| 2006/0031716 A1 * | | 2/2006 | Chen ........................ 714/36 |

FOREIGN PATENT DOCUMENTS

| | | |
|---|---|---|
| JP | A 1-159742 | 6/1989 |
| JP | A 4-135349 | 5/1992 |
| JP | A 5-116601 | 5/1993 |
| JP | A 7-114483 | 5/1995 |
| JP | A 2002-351894 | 12/2002 |
| JP | A 2003-19931 | 1/2003 |
| JP | A 2004-86278 | 3/2004 |

\* cited by examiner

*Primary Examiner*—Nadeem Iqbal
(74) *Attorney, Agent, or Firm*—Greer, Burns & Crain, Ltd.

(57) ABSTRACT

A message analyzing apparatus includes a pickup unit that extracts an error message group from a message file obtained from an input device, a grouping unit that groups the error message group according to physical path, a narrowing down unit that narrows down the error message group, an error-location detecting/identifying unit that selects an error-location identifying message, a suspect-component identifying unit that selects a suspect-component identifying message, a group integrating unit that integrates plural groups, an operational-state identifying unit that selects an operational-state identifying message, and an output unit that generates and outputs the message analysis results to a display device.

10 Claims, 22 Drawing Sheets

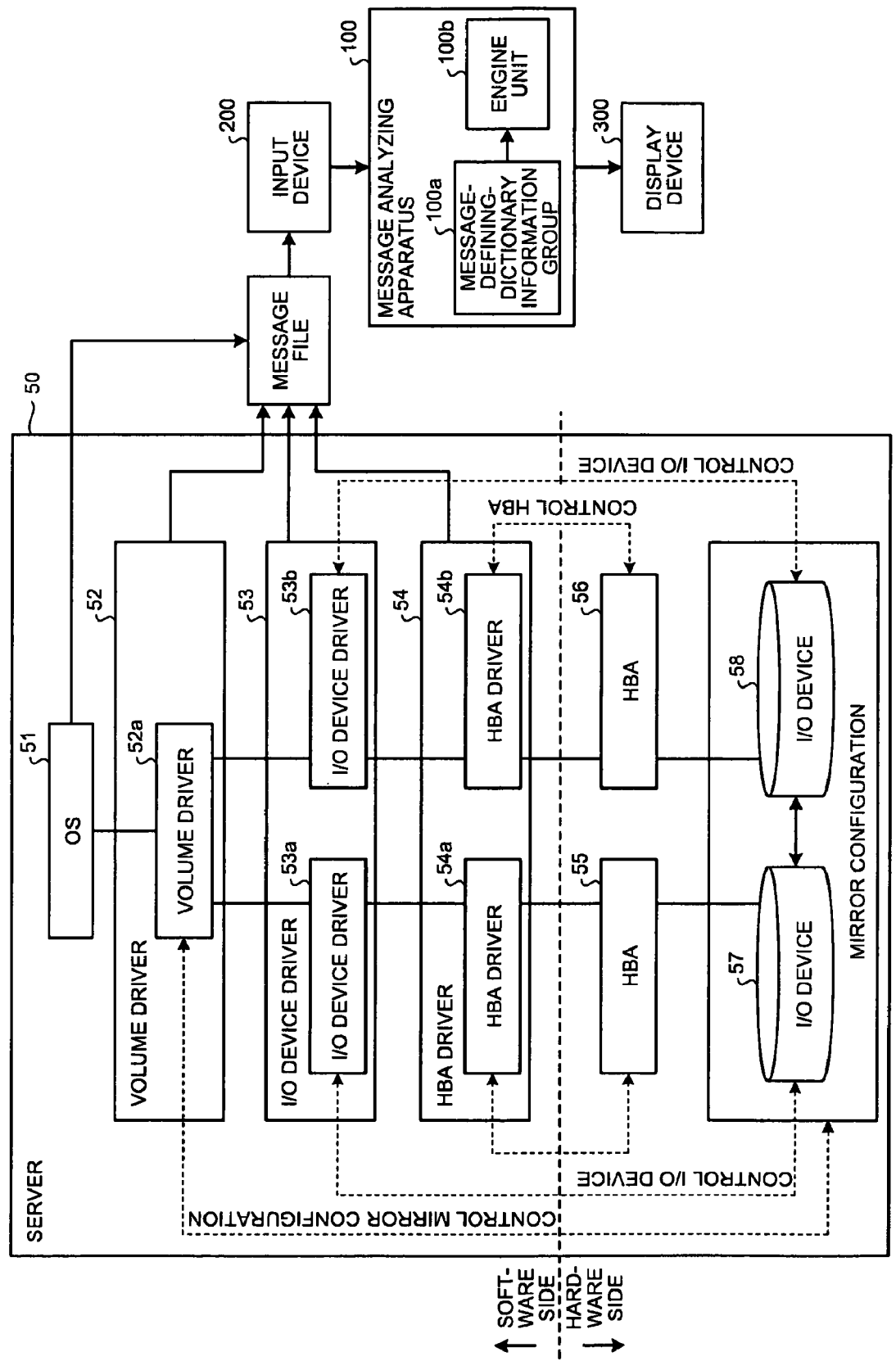

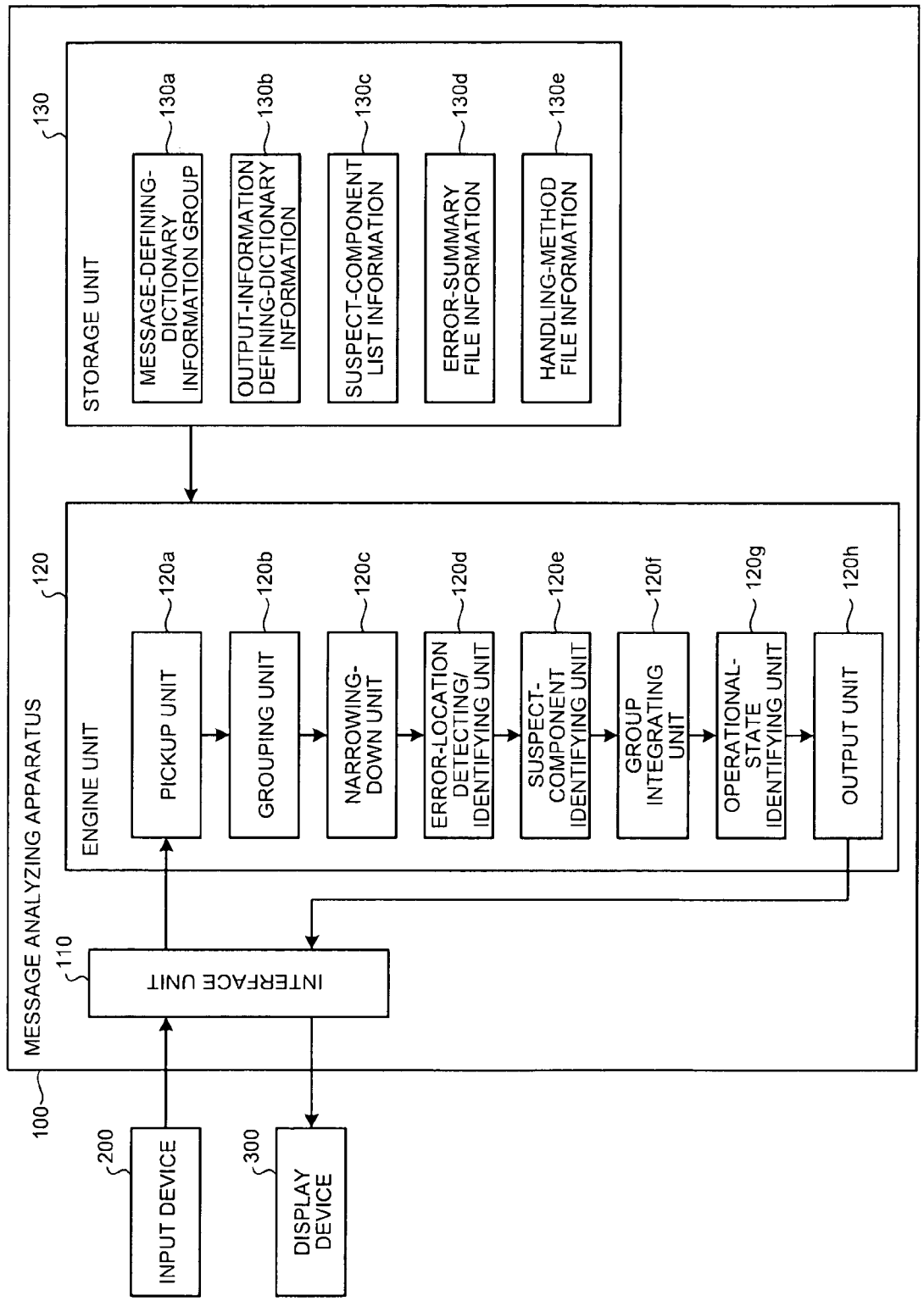

FIG.3

MESSAGE-DEFINING-DICTIONARY INFORMATION GROUP 130a

| | 1 MESSAGE-DEFINING DICTIONARY INFORMATION | 2 MESSAGE-DEFINING DICTIONARY INFORMATION |
|---|---|---|
| REGULAR EXPRESSION FORMAT | WARNING.*mp.*switch no existed. | WARNING.*/disk@.*(disk.*)¥n transport failed ::*retrying |
| NUMBER OF MESSAGE LINES | 3 | 2 |
| CODE | ASCII | ASCII |
| ERROR TYPE | INTERFACE ERROR | HBA ERROR |
| HANDLING METHOD NUMBER | 3, 7 | 3, 7 |
| DRIVER CLASS | HBA | HBA |
| SUSPECT COMPONENT NUMBER | 1, 6, 102 | 2, 8, 105 |
| FAILED/RECOVERED COMPONENT | sd0 ,/pci@80,400/fjulsa@2,0 | sd0 ,/pci@81,420/fjulsa@2,0 |
| WEIGHTING | 5 | 4 |
| FINAL NARROWING-DOWN METHOD | RESTRICT TO LAST MESSAGE | RESTRICT TO FIRST MESSAGE |
| ERROR SUMMARY NUMBER | 1, 20 | 1, 22 |
| INSTANCE NAME ACQUIRING INFORMATION | disk%d:disk array %s reconstruction information | disk%d:disk array %s reconstruction information |
| OPERATIONAL STATE | CONTINUE (RETRYING) | STOP (RETRY-OUT) |

FIG.4

SUSPECT-COMPONENT LIST INFORMATION
130c

| # NUMBER | "SUSPECT COMPONENT NAME" |
|---|---|
| 0 | "NO" |
| # HARDWARE ERROR: PATH COMPONENT (1-100) | |
| 1 | "PCI BUS [PROCESSOR/PCIBox/PCI DISK Box] (HARDWARE FAILURE)" |
| 2 | "PCI CARD (HARDWARE FAILURE)" |
| 3 | "PCI CARD (SETTING ERROR)" |
| 4 | "PCI CARD (MOUNTING POSITION ERROR)" |
| 5 | "CABLE (HARDWARE FAILURE)" |
| 6 | "TERMINATION RESISTOR (HARDWARE FAILURE)" |
| 7 | "GBIC (HARDWARE FAILURE)" |
| 8 | "HUB/SWITCH (HARDWARE FAILURE)" |
| 9 | "HUB/SWITCH (SETTING ERROR)" |
| # HARDWARE ERROR: IO DEVICE/MEDIA (101-200) | |
| 101 | "I/O DEVICE (HARDWARE FAILURE: I/F UNIT)" |
| 102 | "I/O DEVICE (HARDWARE FAILURE: OTHER THAN I/F UNIT)" |
| 103 | "I/O DEVICE (SETTING ERROR)" |
| 104 | "I/O DEVICE (MOUNTING POSITION ERROR)" |
| 105 | "I/O DEVICE (DATA ERROR)" |
| 106 | "I/O DEVICE OR MEDIA (MEDIA ERROR)" |
| 107 | "MEDIA NOT INSERTED" |
| 108 | "OTHER PROCESSOR" |
| # HARDWARE ERROR: CONFIGURATION/CONNECTION (201-300) | |
| 201 | "HARDWARE CONNECTION CONFIGURATION VIOLATION" |
| 202 | "HARDWARE CONNECTION ERROR" |
| 203 | "UNSUPPORTED I/O DEVICE" |
| 204 | "UNSUPPORTED PCI CARD" |
| # RESOURCE ERROR (1001-1100) | |
| 1001 | "MEMORY RESOURCE ACQUISITION FAILURE" |

MESSAGE 1 IN MESSAGE FILE

Jun 7 11:19:54 hostname WARNING: /FC@0/disk@0 (disk2):
Jun 7 11:19:54 hostname transport failed: reason 'reset': retrying command

REGULAR EXPRESSION FORMAT

WARNING.*/disk @.*(disk.*)¥n
transport failed:.*retrying

FIG.6A

NORMAL MESSAGE 

May  3 19:36:18 hostname /FC@0 (fc0):
May  3 19:36:18 hostname Remote node link_status change is detected. IODEVICE_id=0x13.
May  3 19:36:18 hostname WARNING: /FC@0/disk@1 (disk1):
May  3 19:36:18 hostname disk not responding to selection

FIG.6B

MISPLACED MESSAGE 

May  3 19:36:18 hostname WARNING: /FC@0/disk@1 (disk1):
May  3 19:36:18 hostname /FC@0 (fc0):
May  3 19:36:18 hostname Remote node link_status change is detected. IODEVICE_id=0x13.
May  3 19:36:18 hostname disk not responding to selection

FIG.7

ERROR MESSAGE GROUP
400

(1) Jun  7 10:10:22 hostname  /FC@0 (fc0):
    Jun  7 10:10:22 hostname  Remote node link_status change is detected. IODEVICE_id=0x11.
(2) Jun  7 11:19:54 hostname  WARNING: /FC@0/disk@0 (disk2):
    Jun  7 11:19:54 hostname  transport failed: reason 'reset': retrying command
(3) Jun  7 12:11:18 hostname  WARNING: /FC@0/disk@0 (disk2):
    Jun  7 12:11:18 hostname  disk not responding to selection
(4) Jun  7 13:20:34 hostname  NOTICE: mp0: I/O path switchover succeeded.
    Jun  7 13:20:34 hostname  /FC@0/disk@0 => /FC@1/disk@1
(5) Jun  7 14:47:27 hostname  WARNING: /FC@1 (fc1):
    Jun  7 14:47:27 hostname  Link Failure : Cable Problem?
(6) Jun  7 15:19:54 hostname  WARNING: /FC@1/disk@1 (disk4):
    Jun  7 15:19:54 hostname  transport failed: reason 'reset': retrying command
(7) Jun  7 16:11:18 hostname  WARNING: /FC@1/disk@1 (disk4):
    Jun  7 16:11:18 hostname  disk not responding to selection
(8) Jun  7 16:21:16 hostname  WARNING: mp0: I/O path for switch no existed.

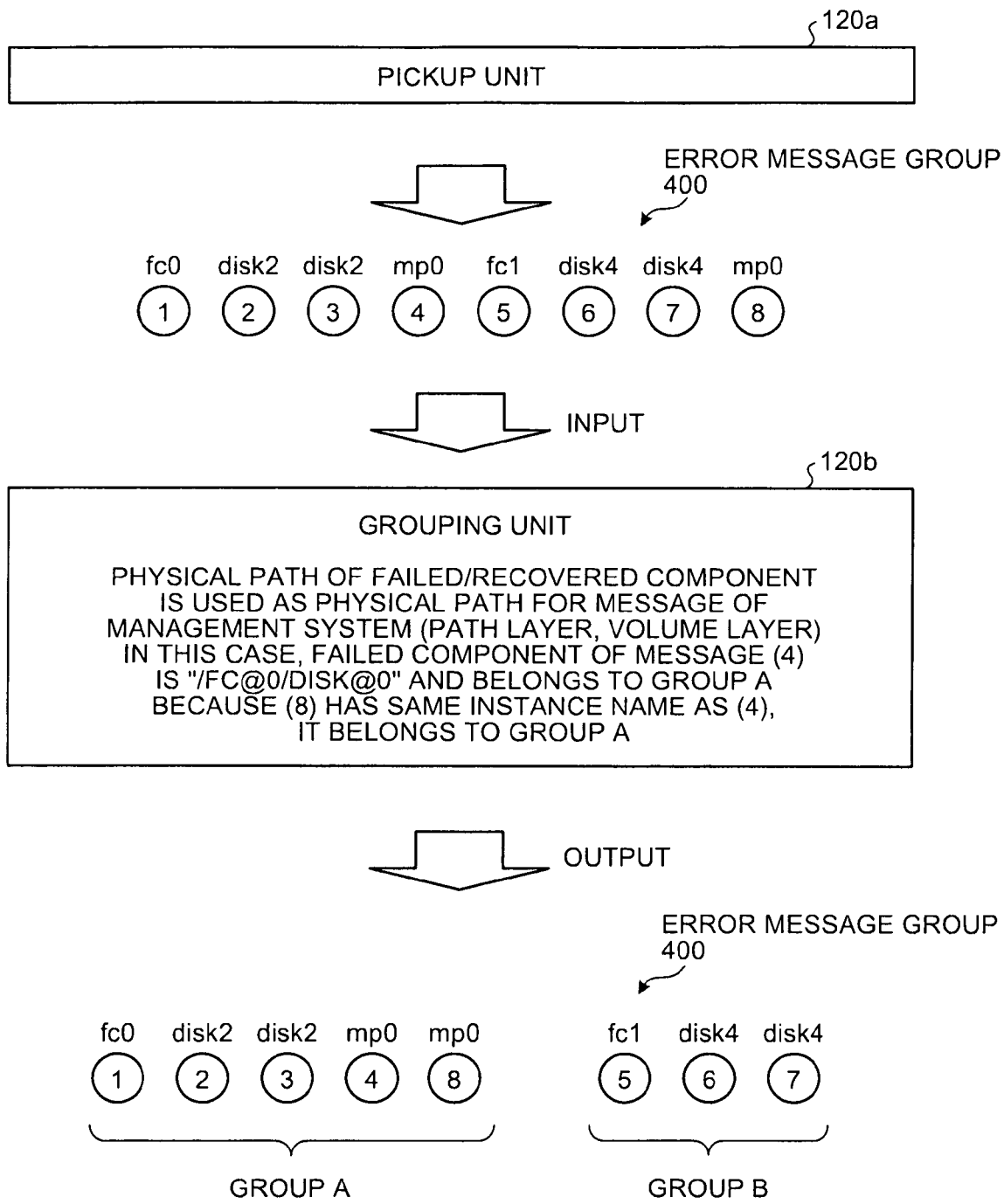

FIG.13

```
[/ Group 1 (I/O) /]
[DETECTED DATE]
 Jun  7 10:10:22 - Jun  7 16:21:16
[ERROR SUMMARY]
 fc0:(0002-0003)
  CHANGE IN LINK STATE OF I/O DEVICE IS DETECTED
 fc1:(0002-0013)
  OPTICAL SIGNAL OF OPPOSING DEVICE CANNOT BE DETECTED OR SYNCHRONIZED
[SUSPECT COMPONENT: PRIORITY IN <>]
 fc0:
  - I/O DEVICE (HARDWARE FAILURE: I/F UNIT) <1>
  - GBIC (HARDWARE FAILURE) <1>
  - CABLE (HARDWARE FAILURE) <3>
  - HUB/SWITCH (HARDWARE FAILURE) <4>
 fc1:
  - GBIC (HARDWARE FAILURE) <1>
  - PCI CARD (HARDWARE FAILURE) <1>
  - CABLE (HARDWARE FAILURE) <3>
  - HUB/SWITCH (HARDWARE FAILURE) <4>
[HANDLING METHOD]
 fc0:
  CONFIRM THE FOLLOWING:
   · CONNECTION OF OPTICAL FIBER
   · OPERATIONAL STATE OF I/O DEVICE
   · OPERATIONAL STATE OF CONNECTING DEVICE SUCH AS HUB/SWITCH
 fc1:
  CONFIRM CONNECTION OR STATUS OF SUSPECT COMPONENT
[DETECTED ERROR POSITION: * IS OBJECT TO BE PREVENTIVELY REPLACED]
 /FC@0 (fc0)
 /FC@0/disk@0 (disk2)
 /FC@1 (fc1)
 /FC@1/disk@1 (disk4)
[OPERATIONAL STATE]
 mp0: STOP (REDUNDANT COMPONENTS ARE ALL OBSTRUCTED)
[MESSAGE TO BE RESTRICTED]
 Jun  7 10:10:22 hostname   /FC@0 (fc0):
 Jun  7 10:10:22 hostname   Remote node link_status change is detected. IODEVICE_id=0x11.
  Jun  7 12:11:18 hostname   WARNING: /FC@0/disk@0 (disk2):
  Jun  7 12:11:18 hostname   disk not responding to selection
  Jun  7 14:47:27 hostname   WARNING: /FC@1 (fc1):
  Jun  7 14:47:27 hostname   Link Failure : Cable Problem?
  Jun  7 16:11:18 hostname   WARNING: /FC@1/disk@1 (disk4):
  Jun  7 16:11:18 hostname   disk not responding to selection
    Jun  7 16:21:16 hostname   WARNING: mp0: I/O path for switch no existed.
```

MESSAGE ANALYZING APPARATUS, MESSAGE ANALYZING METHOD, AND COMPUTER PRODUCT

This is a continuation filed under 35 U.S.C. §111(a), of International Application No. PCT/JP2005/012995, filed Jul. 14, 2005.

BACKGROUND OF THE INVENTION

1. Field of the Invention

The present invention relates to a message analyzing apparatus that analyzes messages related to a state of hardware configuring a computer, which messages are generated by software managing the hardware.

2. Description of the Related Art

Conventionally, to enhance reliability and the like of a computer, an administrator of the computer must regularly (or irregularly) acquire messages including an operational state of the computer and information such as an error (hereinafter, error message) from the computer, to identify the location of an error in the computer, and correct the identified error.

However, the messages outputted from the computer include not only the error message but also various kinds of information, and the amount of the messages is considerable. Therefore, a great burden is imposed on the administrator analyzing the messages, and identifying and correcting an error in the computer.

Recently, dictionary information that consists of regular expressions associated with plural error messages is previously generated. Based on this dictionary information, the great amount of messages outputted from the computer is narrowed down only to error messages. Accordingly, the amount of messages to be analyzed by the administrator is reduced to lessen the burden on the administrator.

Japanese Patent Application Laid-open No. 2002-351894 describes a technology of adding attributes to messages outputted from a computer, and coupling these messages based on coupling information that defines the order of coupling of these attributes and the like, thereby rearranging the messages in an optimal order.

However, in the conventional technology, the amount of messages to be analyzed by the administrator can be reduced to some extent, while when finally identifying the location of an error, the administrator must consider correlation among plural kinds of error messages outputted from drivers or applications of different layers, and analyze each of the error messages to identify the location of an error. Therefore, a substantial burden is still impacted on the administrator.

When the location of an error is identified based on plural error messages, specialized information is required. Therefore, the administrator must contact a designer of the computer about the error messages to identify the error location, resulting in great inefficiency and increase in the cost.

That is, to lessen the burden on the administrator and to efficiently determine the location of an error in the computer considering the correlation among error messages is a greatly important subject.

The present invention has been achieved in view of the problem above mentioned. An object of the present invention is to provide a message analyzing apparatus that can lessen the burden on the administrator and efficiently determine the location of an error in the computer considering the correlation among error messages.

SUMMARY OF THE INVENTION

It is an object of the present invention to at least partially solve the problems in the conventional technology.

According to an aspect of the invention, there is provide a message analyzing apparatus that analyzes a plurality of messages which are related to a state of hardware constituting a computer and are generated respectively by pieces of software managing the hardware. The message analyzing apparatus includes a message storing unit that stores therein the plurality of messages, and a determining unit that determines the state of the computer by comparing the plurality of messages stored in the message storing unit.

According to another aspect of the invention, there is provided a message analyzing method that analyzes a plurality of messages which are related to a state of hardware constituting a computer and are generated respectively by pieces of software managing the hardware. The message analyzing method comprises storing the plurality of messages in a message storing unit, and determining a state of the computer by comparing the plurality of messages stored in the message storing unit.

According to still another aspect of the present invention, a computer-readable recording medium stores therein a computer program that implements the above method on a computer.

BRIEF DESCRIPTION OF THE DRAWINGS

FIG. 1 is an explanatory diagram for explaining a concept of a message analyzing apparatus according to an embodiment;

FIG. 2 is a functional block diagram of a configuration of the message analyzing apparatus according to the embodiment;

FIG. 3 is an example of a data configuration of a message-defining-dictionary information group;

FIG. 4 is an example of a data configuration of suspect-component list information;

FIG. 6 is an explanatory diagram for explaining a misplaced message;

FIG. 7 is an example of a message group extracted by the pickup unit;

FIG. 8 is an explanatory diagram for supplementarily explaining a process performed by a grouping unit;

FIG. 13 is an example of a message analysis result displayed on a display device;

DETAILED DESCRIPTION OF THE PREFERRED EMBODIMENTS

Figure 5A:
FIG. 5 is an explanatory diagram for explaining a process performed by a pickup unit.

Exemplary embodiments of a message analyzing apparatus according to the present invention will be explained below in detail with reference to the accompanying drawings. Note that the present invention is not limited to the following embodiments.

The concept of a message analyzing apparatus according to an embodiment is explained. FIG. 1 is an explanatory diagram for explaining the concept of a message analyzing apparatus according to the embodiment. FIG. 1 depicts an exemplary case that a message analyzing apparatus 100 acquires, from a server 50 that performs a predetermined operation, a message file including plural messages that indicate an operational state of the server 500, and determines a state of the server from the acquired message file.

The server 50 includes an OS (Operating System) 51, a volume driver 52, an I/O (Input/Output) device driver 53, a HBA (Host Bust Adapter) driver 54, HBAs 55 and 56, and I/O devices 57 and 58.

The OS 51 is a processor that performs management of files, management of memories, management of input/output, provision of a user interface, and the like. The volume driver 52 is a processor that controls a mirror configuration of the I/O devices 57 and 58. In the case shown in FIG. 1, a volume driver 52a included in the volume driver 52 controls the mirror configuration of the I/O devices 57 and 58.

The I/O device driver 53 is a processor that controls the I/O devices 57 and 58. In the case shown in FIG. 1, an I/O device driver 53a included in the I/O device driver 53 controls the I/O device 57 and an I/O device driver 53b controls the I/O device 58.

The HBA driver 54 is a processor that controls the HBAs 55 and 56. In the case shown in FIG. 1, a HBA driver 54a included in the HBA driver 54 controls the HBA 55 and a HBA driver 54b controls the HBA 56.

The HBA 55 and 56 are devices that connect the HBA driver 54 and the I/O devices 57 and 58 to relay predetermined information. The I/O devices 57 and 58 are storage devices that stores information. The I/O devices 57 and 58 are mirrored.

The server 50 outputs plural messages outputted from the OS 51, the volume driver 52, the I/O device driver 53, and the HBA driver 54, as a message file. The message analyzing apparatus 100 acquires the message file from the server 50 through an input device 200.

The message analyzing apparatus 100 analyzes correlation among the plural messages included in the message file, based on various data (130a through 130e shown in FIG. 2) such as a message-defining-dictionary information group (100a shown in FIG. 2), determines a faulty component and/or an operational state of the server 50, and outputs the result of determination to a display device 300.

The message analyzing apparatus 100 determines an error occurrence position, the location of a faulty component, or the operational state based on the message file, which reduces the burden on the administrator.

A configuration of the message analyzing apparatus according to the embodiment is explained. FIG. 2 is a functional block diagram of a configuration of the message analyzing apparatus according to the embodiment. As shown in FIG. 2, the message analyzing apparatus 100 includes an interface unit 110, an engine unit 120, and a storage unit 130. The message analyzing apparatus 100 is connected to the input device 200 such as a keyboard and a mouse and to the display device 300 such as a display.

The interface unit 110 is a processor that transfers information such as a message file inputted from the input device 200 to the engine unit 120. The interface unit 110 outputs information acquired from the engine unit 120 to the display device 300.

The engine unit 120 is a processor that determines an error occurrence state of a computer that outputs the message file acquired from the input device 200 (the server 50 in the case shown in FIG. 1), based on the message file and a message-defining-dictionary information group 130a stored in the storage unit 130.

The message-defining-dictionary information group 130a is explained. FIG. 3 is an example of a data configuration of the message-defining-dictionary information group 130a. As shown in FIG. 3, the message-defining-dictionary information group 130a includes a "regular expression format", the "number of message lines", a "code", an "error type", a "handling method number", a "driver class", a "suspect component number", a "failed/recovered component", "weighting", a "final narrowing-down method", an "error summary number", "instance name acquiring information", and an "operational state". The message-defining-dictionary information group 130a includes plural kinds of message-defining dictionary information 1, 2, . . . . For convenience of explanation, only message-defining dictionary information 1 and 2 is shown, and other message-defining dictionary information is omitted.

The "regular expression format" is information for associating messages included in a message file with message-defining dictionary information included in the message-defining-dictionary information group 130a. For example, in the case shown in FIG. 3, a message in a message file, having a format conforming to the regular expression format of "WARNING.*mp.*switch no existed.", is associated with the message-defining dictionary information 1. The regular expression format is used to pick up a predetermined message from the message file.

The "number of message lines" is information indicating the number of lines that constitute a message to be associated with the message-defining dictionary information. In the message-defining dictionary information 1 shown in FIG. 3, the message is formed by "three" lines. The "code" is information indicating a character code that is used for the message. The code in the message-defining dictionary information 1 shown in FIG. 3 is "ASCII".

The "error type" indicates the type of an error in a message associated with the message-defining dictionary information. For example, the type of an error in the message associated with the message-defining dictionary information 1 in FIG. 3 is an "interface error".

The "handling method number" is information for identifying a location where information concerning an error handling method is recorded (the error handing method is recorded in handling-method file information 130e shown in FIG. 2). That is, in the message-defining dictionary information 1 in FIG. 3, the handling method concerning the error type of "interface error" is recorded in numbers "3" and "7" in the handling-method file information 130e. The handling-method file information 130e is information including a list of error handling methods, in which numbers and error handling methods are related to each other in a one-to-one correspondence. An example of the error handling method is "to check a connection status and the like of a suspect component".

The "driver class" indicates class layer information of a driver to which a message associated with a message-defining dictionary information belongs. The message-defining dictionary information 1 in FIG. 3 indicates that the message associated with the message-defining dictionary information 1 belongs to a HBA layer.

The "suspect component number" is information for identifying a location where information of a component that is to be replaced when an error identified by the error type occurs is recorded (information of a component to be replaced is recorded in suspect-component list information 130c shown in FIG. 2). That is, in the message-defining dictionary information 1 in FIG. 3, information of a component to be replaced, related to the error type of "interface error", is recorded in numbers "1", "6", and "102" in the suspect-component list information 130c.

FIG. 4 is an example of a data configuration of the suspect-component list information 130c. As shown in FIG. 4, in the suspect-component list information 130c, numbers and information of components to be replaced are associated with each other. From FIGS. 3 and 4, a component to be replaced corresponding to a suspect component number "1" is a "PCI bus [Processor/PCIBox/PCI disk Box] (hardware failure)". A component to be replaced corresponding to a suspect component number "6" is a "termination resistor (hardware failure)", and a component to be replaced corresponding to a suspect component number "102" is an "I/O device (hardware failure: other than I/F unit)".

Returning to explanations of FIG. 3, the "failed/recovered component" indicates information of an instance name (a logical name for associating a device such as a disk or a tape with a control driver) or a physical path managed by a managing system message that manages a redundant configuration of a path or a volume.

The "weighting" indicates a priority of a message associated with the message-defining dictionary information. When the value of the weighting is larger, the priority is higher. The "final narrowing-down method" is information indicating, when plural messages have the same value of the weighting, how to decide priorities of the messages. Because the final narrowing-down method is "narrowing down to a last message" in the message-defining dictionary information 1 shown in FIG. 3, a message appearing last is given a highest priority when plural messages have the same value of the weighting.

The "error summary number" is information for identifying a location where information concerning an error summary of a message associated with the message-defining dictionary information is recorded (the error summary is recorded in error-summary file information 130d shown in FIG. 2). That is, because the error summary numbers are "1" and "20" in the message-defining dictionary information 1 in FIG. 3, the error summary of the message is recorded in the numbers "1" and "20" in the error-summary file information 130d. The error-summary file information 130d is information including a list of error summaries, in which numbers and error summaries are related to each other in a one-to-one correspondence. An example of the error summary is "an optical signal of an opposing device cannot be detected or synchronized".

The "instance name acquiring information" is information indicating in which part of a message included in a message file the instance information is included. The instant information is information indicating a correspondence between a device and a driver for controlling the device.

The "operational state" is information indicating an operational state of an instance (that is, a device and a control driver that controls the device) concerning a message associated with the message-defining dictionary information. For example, it is seen that an instance of a message associated with the message-defining dictionary information 1 shown in FIG. 3 is continuing (retrying).

Returning to explanations of the engine unit 120 shown in FIG. 2, the engine unit 120 includes a pickup unit 120a, a grouping unit 120b, a narrowing down unit 120c, an error-location detecting/identifying unit 120d, a suspect-component identifying unit 120e, a group integrating unit 120f, an operational-state identifying unit 120g, and an output unit 120h.

The pickup unit 120a is a processor that extracts messages having formats conforming to each regular expression format in the message-defining-dictionary information group 130a, based on the message file inputted from the input device 200 and the message-defining-dictionary information group 130a. Although not shown, the pickup unit 120a temporarily stores the message file in the storage unit 130.

FIG. 7 is an example of a group of messages extracted by the pickup unit 120a from a predetermined message file (not shown here). The message group shown in FIG. 7 is hereinafter referred to as an error message group 400, and messages included in the error message group 400 are referred to as error messages. FIG. 7 depicts a case that error messages 1 to 8 are extracted.

As shown in FIG. 7, the instances of error messages 2 and 3, of error messages 4 and 8, and of error messages 6 and 7 are the same, respectively. That is, the error messages 2 and 3 coincide in an instance (disk2), the error messages 4 and 8 coincide in an instance (mp0), and the error messages 6 and 7 coincide in an instance (disk4).

As shown in FIG. 7, the error messages 1 and 5 belong to a HBA layer, the messages 2, 3, 6 and 7 belong to a target layer, and the messages 4 and 8 belong to a path managing layer.

Although not included in the error messages 1 to 8 in FIG. 7, there is also a layer belonging to the volume driver 52 shown in FIG. 1, i.e., a volume layer. The HBA layer, the target layer, the path managing layer, and the volume layer are arranged in an ascending order of the levels (the volume layer is the highest level).

In this embodiment, the respective processors, i.e., the grouping unit 120b, the narrowing down unit 120c, the error-location detecting/identifying unit 120d, the suspect-component identifying unit 120e, the group integrating unit 120f, the operational-state identifying unit 120g, and the output unit 120h are explained using the error message group 400 as an example.

The grouping unit 120b is a processor that acquires the error message group 400 from the pickup unit 120a, and groups error messages included in the error message group 400 according to physical paths of the error messages.

The grouping unit 120b can divide the error messages in the error message group 400 into groups having physical paths of (/FC@0) and (/FC@1). Specifically, the grouping unit 120*b* can divide the error messages into a group of the error messages 1, 2, 3, 4 and 8, and a group of the error messages 5, 6 and 7. The group of the error messages 1, 2, 3, 4 and 8 is hereinafter referred to as a "group A" and the group of the error messages 5, 6 and 7 is referred to as a "group B". FIG. 8 is an explanatory diagram for supplementarily explaining the process performed by the grouping unit 120*b*.

The narrowing down unit 120*c* is a processor that acquires information of the error message group 400, the message-defining dictionary information corresponding to each error message and information of the groups A and B divided by the grouping unit 120*b*, and narrows down the total number of error messages.

Specifically, the narrowing down unit 120*c* initially identifies error messages having an identical instance. In the error message group 400, the instances of the error messages 2 and 3, the instances of the error messages 4 and 8, and the instances of the error messages 6 and 7 are identical to each other.

The narrowing down unit 120*c* acquires the message-defining dictionary information corresponding to the error messages 2, 3, 4, 8, 6 and 7, and selects error messages having a higher priority based on values set for the "weighting". In this embodiment, it is assumed that a larger value of the weighting is set for the error message 3 than the error message 2, a larger value of the weighting is set for the error message 8 than the error message 4, and a larger value of the weighting is set for the error message 7 than the error message 6.

Figure 9:
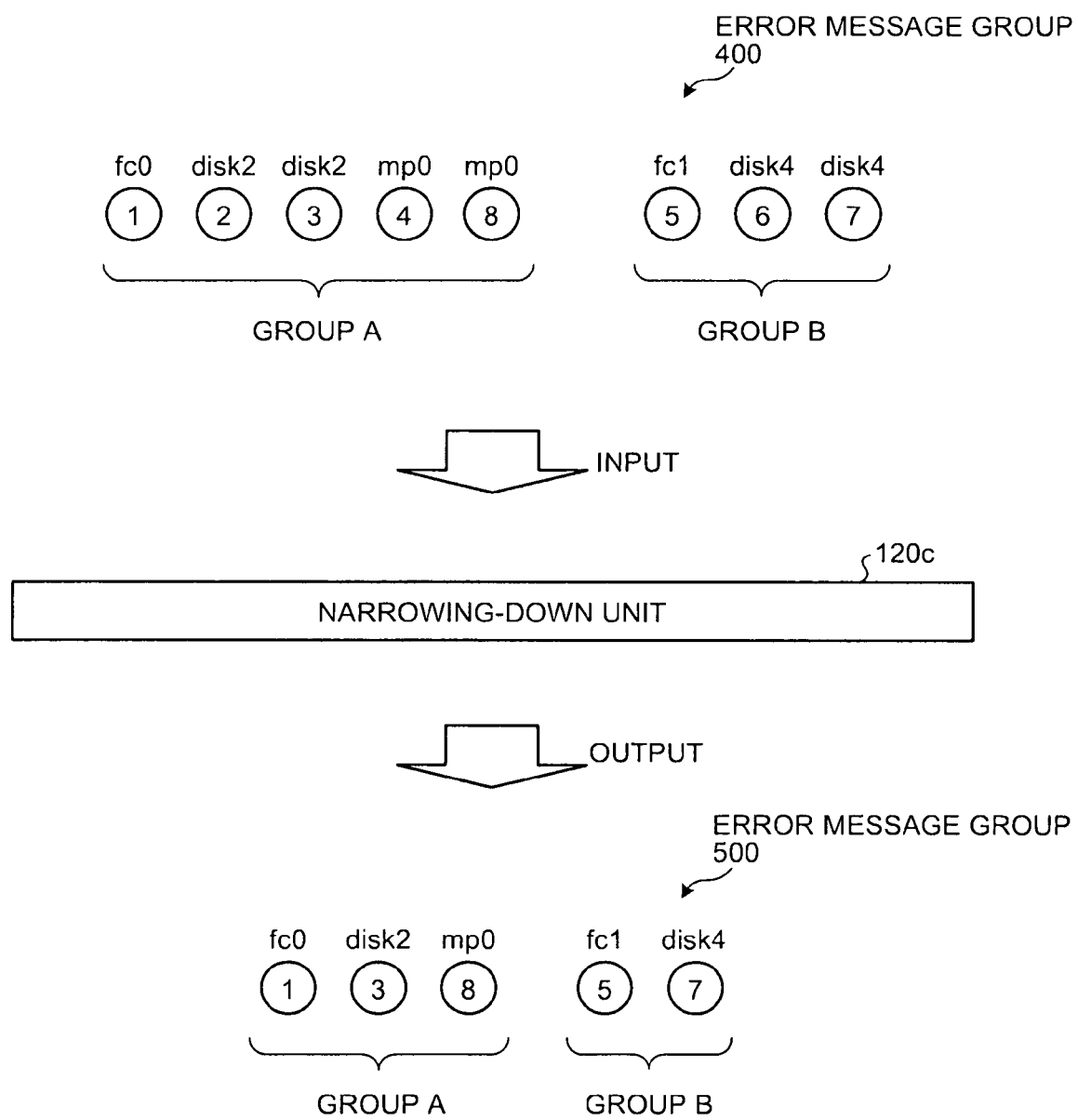
FIG. 9 is an explanatory diagram for supplementarily explaining a process performed by a narrowing-down unit.

The narrowing down unit 120*c* performs the process above mentioned to narrow down the error messages 1 to 8 into the error messages 1, 3, 5, 7, and 8 (hereinafter, an error message group 500). FIG. 9 is an explanatory diagram for supplementarily explaining the process performed by the narrowing down unit 120*c*.

The error-location detecting/identifying unit 120*d* is a processor that acquires the error message group 500 and the message-defining dictionary information corresponding to each error message in the error message group 500 from the narrowing down unit 120*c*, to identify an error occurrence position.

Specifically, the error-location detecting/identifying unit 120*d* identifies operational states of the respective message-defining dictionary information corresponding to the error message group 500 and the layers to which the error messages belong (such as the HBA layer and the target layer), and uses an error message of a certain operational state (for example, stop or degeneracy) between the lowest layer (the HBA layer) and a certain layer (for example, the volume layer) as an error message for identifying an error location (hereinafter, an error-location identifying message).

Figure 10:
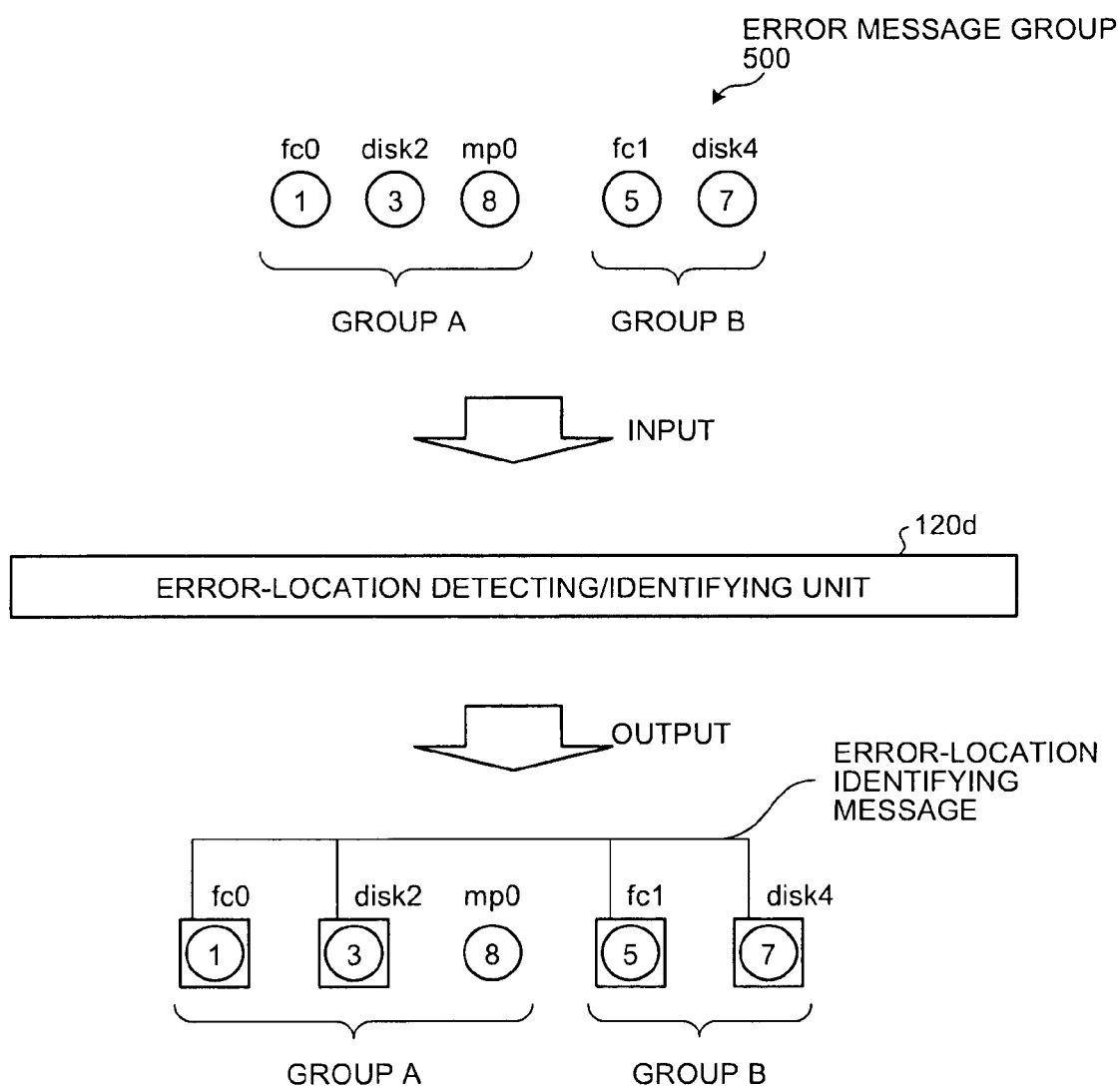
FIG. 10 is an explanatory diagram for supplementarily explaining a process performed by an error-location detecting/identifying unit.

In this embodiment, the error-location detecting/identifying unit 120*d* selects the error messages 1, 3, 5 and 7 from the error message group 500, as error-location identifying messages. FIG. 10 is an explanatory diagram for supplementarily explaining the process performed by the error-location detecting/identifying unit 120*d*.

The suspect-component identifying unit 120*e* is a processor that acquires the error message group 500 and the message-defining dictionary information corresponding to the respective error messages in the error message group 500 from the narrowing down unit 120*c*, and identifies a faulty component in the computer.

Specifically, the suspect-component identifying unit 120*e* identifies error types of the respective message-defining dictionary information corresponding to the error message group 500*a* and layers to which the error messages belong, and uses an error message in the lowest layer (nearest to hardware) among the error messages, as an error message that identifies a faulty computer component (hereinafter, a suspect-component identifying message).

Figure 11:
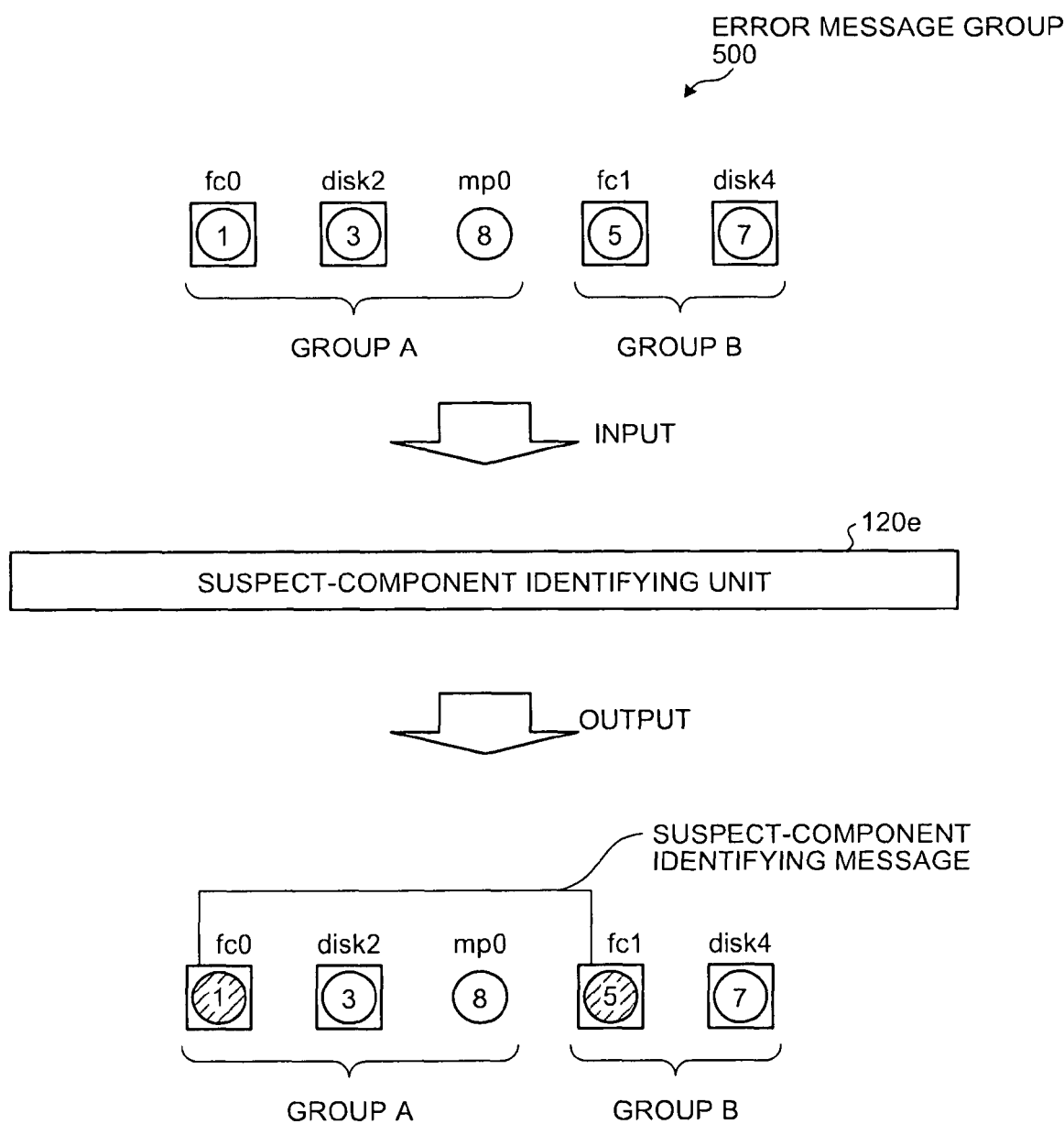
FIG. 11 is an explanatory diagram for supplementarily explaining a process performed by a suspect-component identifying unit.

The suspect-component identifying unit 120*e* selects the respective error messages as the suspect-component identifying messages when there is no correlation between the error types of the groups. For example, when the error messages 1, 3, and 8 in the group A have the error type of an interface error and relate to each other, the error message 1 in the lowest layer is selected as the suspect-component identifying message. When the error types of the error messages 1, 3, and 8 are different, the error messages in plural layers are selected as the suspect-component identifying message, respectively. In this embodiment, it is assumed that the error types of the error messages relate to each other. FIG. 11 is an explanatory diagram for supplementarily explaining the process performed by the suspect-component identifying unit 120*e*. As shown in FIG. 11, the error messages 1 and 5 are selected as the suspect-component identifying messages in this embodiment.

The group integrating unit 120*f* is a processor that acquires the error message group 500 and the message-defining dictionary information corresponding to the error messages in the error message group 500 from the suspect-component identifying unit 120*e*, and integrates error messages having the same failed/recovered component in the message-defining dictionary information.

Figure 12:
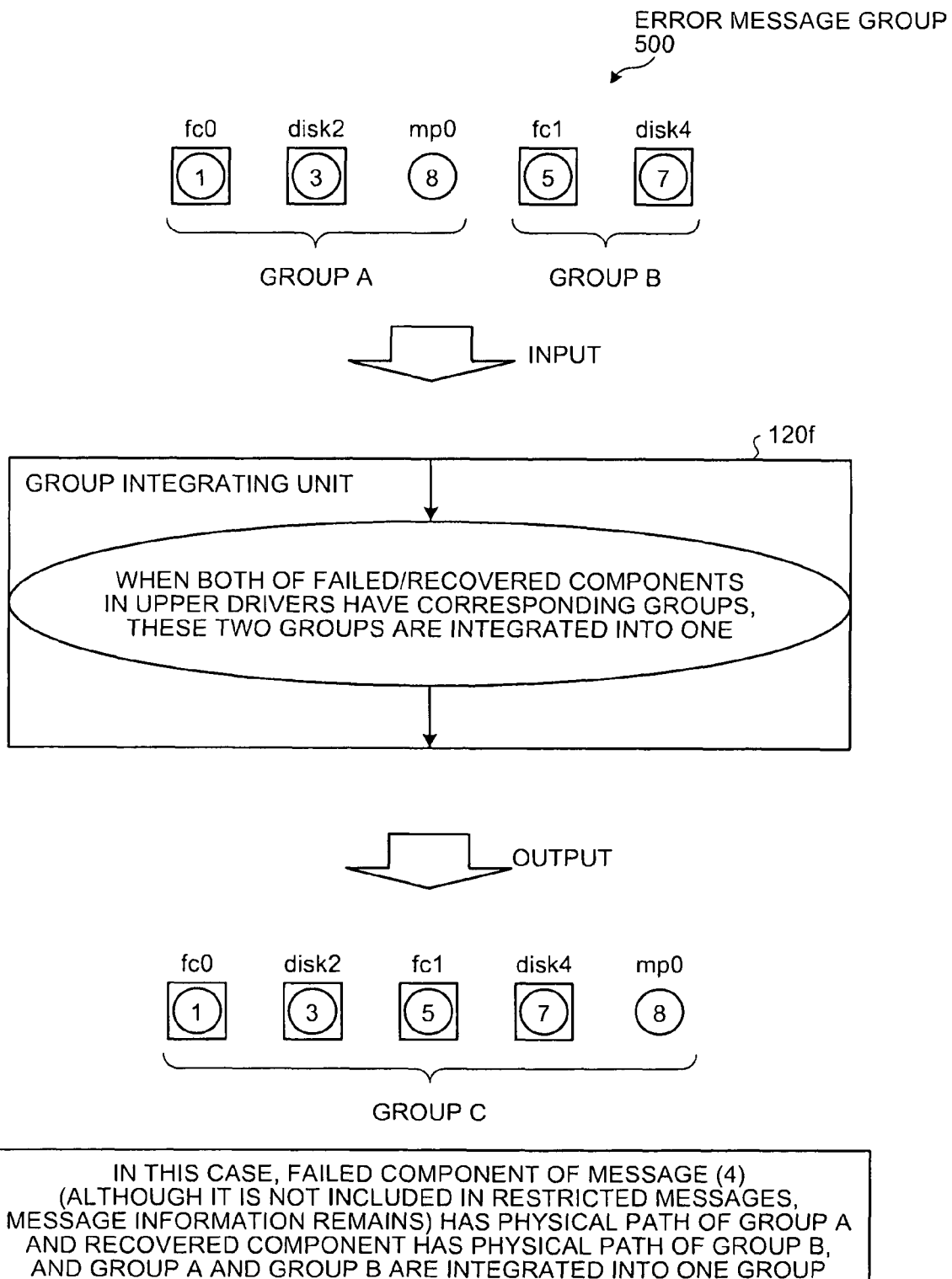
FIG. 12 is an explanatory diagram for supplementarily explaining a group coupling unit.

In the error message group 500 according to this embodiment, failed/recovered components of the respective message-defining dictionary information are the same. Therefore, the group A and the group B are integrated into a "group C". FIG. 12 is an explanatory diagram for supplementarily explaining the process performed by the group integrating unit 120*f*.

The operational-state identifying unit 120*g* acquires the error message group 500, information of the integrated group C, and the message-defining dictionary information corresponding to the error messages from the group integrating unit 120*f*, and selects an error message in the highest layer as an operational-state identifying message. In this embodiment, the error message 8 is an error message in the highest layer. Therefore, the operational-state identifying unit 120*g* selects the error message 8 as the operational-state identifying message.

The output unit 120*h* is a processor that acquires the information of the error message group 400, and information of the error-location identifying message, the suspect-component identifying message and the operational-state identifying message from the corresponding processors (the error-location detecting/identifying unit 120*d*, the suspect-component identifying unit 120*e*, and the operational-state identifying unit 120*g*), and outputs information of an error occurrence state (hereinafter, a message analysis result) in the computer (the server 50 in the case shown in FIG. 1), based on the acquired information, the message-defining-dictionary information group 130*a*, output-information defining-dictionary information 130*b*, the suspect-component list information 130*c*, the error-summary file information 130*d*, and the handling-method file information 130*e*, to the display device 300.

FIG. 13 is an example of the message analysis result displayed on the display device 300. As shown in FIG. 13, the message analysis result includes a "summary", a "suspect component", a "handling method", a "detected position", an "operational state", and "messages to be narrowed". A format and the like of the display screen are set in the output-information defining-dictionary information 130b.

The "summary" indicates an error summary that is identified by an error summary number of the message-defining dictionary information corresponding to the error-location identifying message, and the error summary file information 130d. The "suspect component" indicates information of a suspect component that is identified by a suspect component number in the message-defining dictionary information corresponding to the suspect-component identifying message, and the suspect-component list information 130c.

The "handling method" indicates an error handling method that is identified by a handling method number in the message-defining dictionary information corresponding to the error-location identifying message, and the handling-method file information 130e. The "detected position" indicates information of a failed/recovered component (information of a component in which a failure occurs) in the message-defining dictionary information corresponding to the suspect-component identifying message.

The "operational state" indicates information of an operational state in the message-defining dictionary information corresponding to the operational-state identifying message. The "messages to be narrowed" indicate respective information of error messages in the error message group 400.

By referring to the display screen shown in FIG. 13, the administrator can easily identify an error location or a failed component in the computer, which reduces the burden on the administrator.

Figure 14:
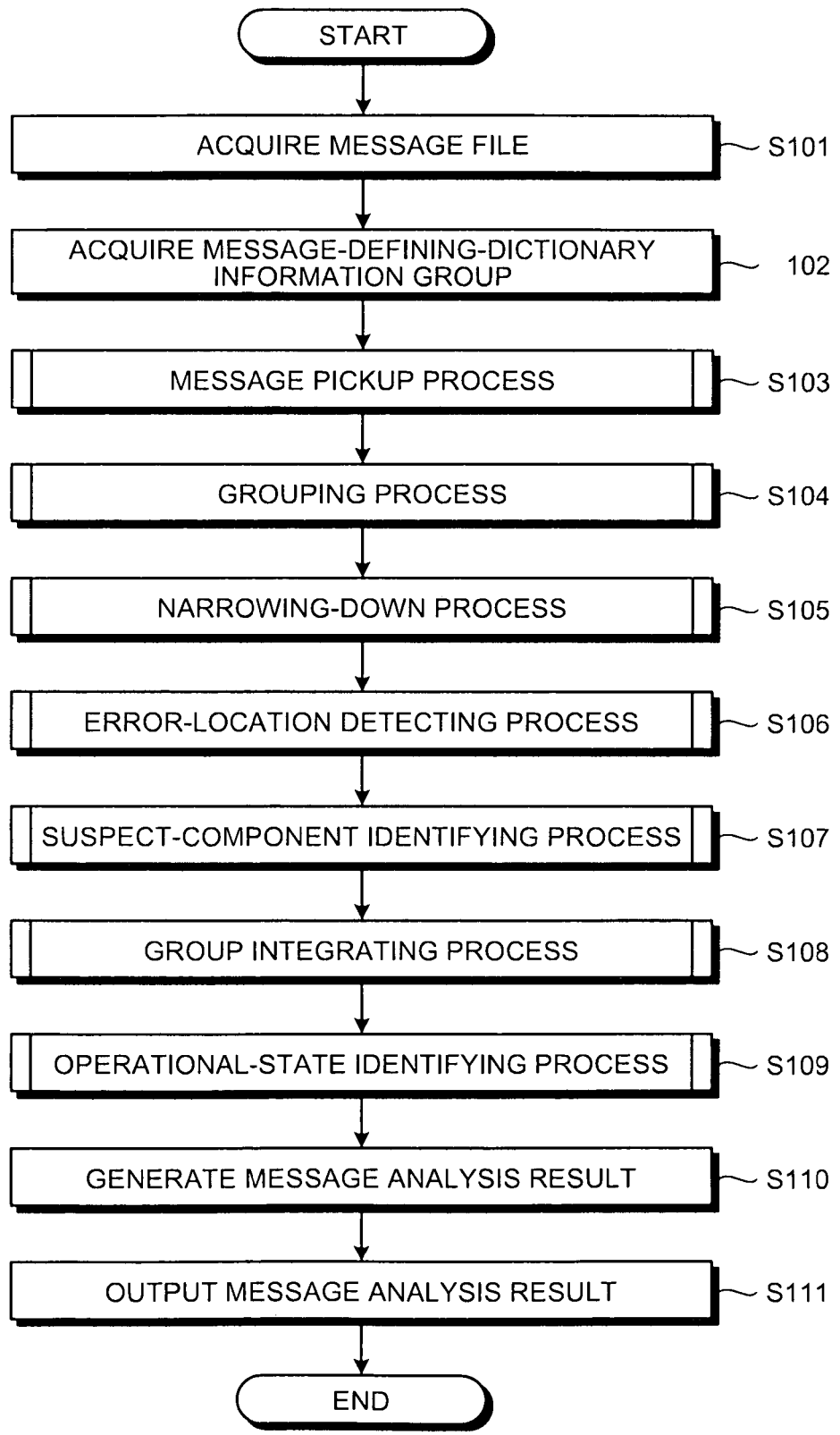
FIG. 14 is a flowchart of a process procedure performed by the message analyzing apparatus according to the embodiment.

An operation of the message analyzing apparatus 100 according to the embodiment is explained. FIG. 14 is a flowchart of a process procedure performed by the message analyzing apparatus 100 according to the embodiment. As shown in FIG. 14, in the message analyzing apparatus 100, the engine unit 120 acquires a message file from the input device 200 (step S101), to acquire the message-defining-dictionary information group 130a (step S102).

The pickup unit 120a performs a message pickup process (step S103), the grouping unit 120b performs a grouping process (step S104), and the narrowing down unit 120c performs a narrowing-down process (step S105).

Subsequently, the error-location detecting/identifying unit 120d performs an error-location detecting process (step S106), the suspect-component identifying unit 120e performs a suspect-component identifying process (step S107), and the group integrating unit 102f performs a group integrating process (step S108).

The operational-state identifying unit 120g performs an operational-state identifying process (step S109). The output unit 120h generates a message analysis result (step S110) and outputs the message analysis result to the display device 300 (step S111), which completes the message analyzing process of FIG. 14.

Figure 5B:

The message pickup process at step S103 shown in FIG. 14 is explained. FIG. 5 is an explanatory diagram for explaining the message pickup process performed by the pickup unit 120a. As shown in FIG. 5, a message 1 in the message file (only the message 1 is shown for convenience of explanation) conforms to a regular expression format: "WARNING.*/disk @.*(disk.*)¥n transport failed:.*retrying" defined in the message-defining dictionary information 2 shown in FIG. 3. Therefore, the message 1 is associated with the message-defining dictionary information 2 and extracted by the pickup unit 120a.

Figure 15:
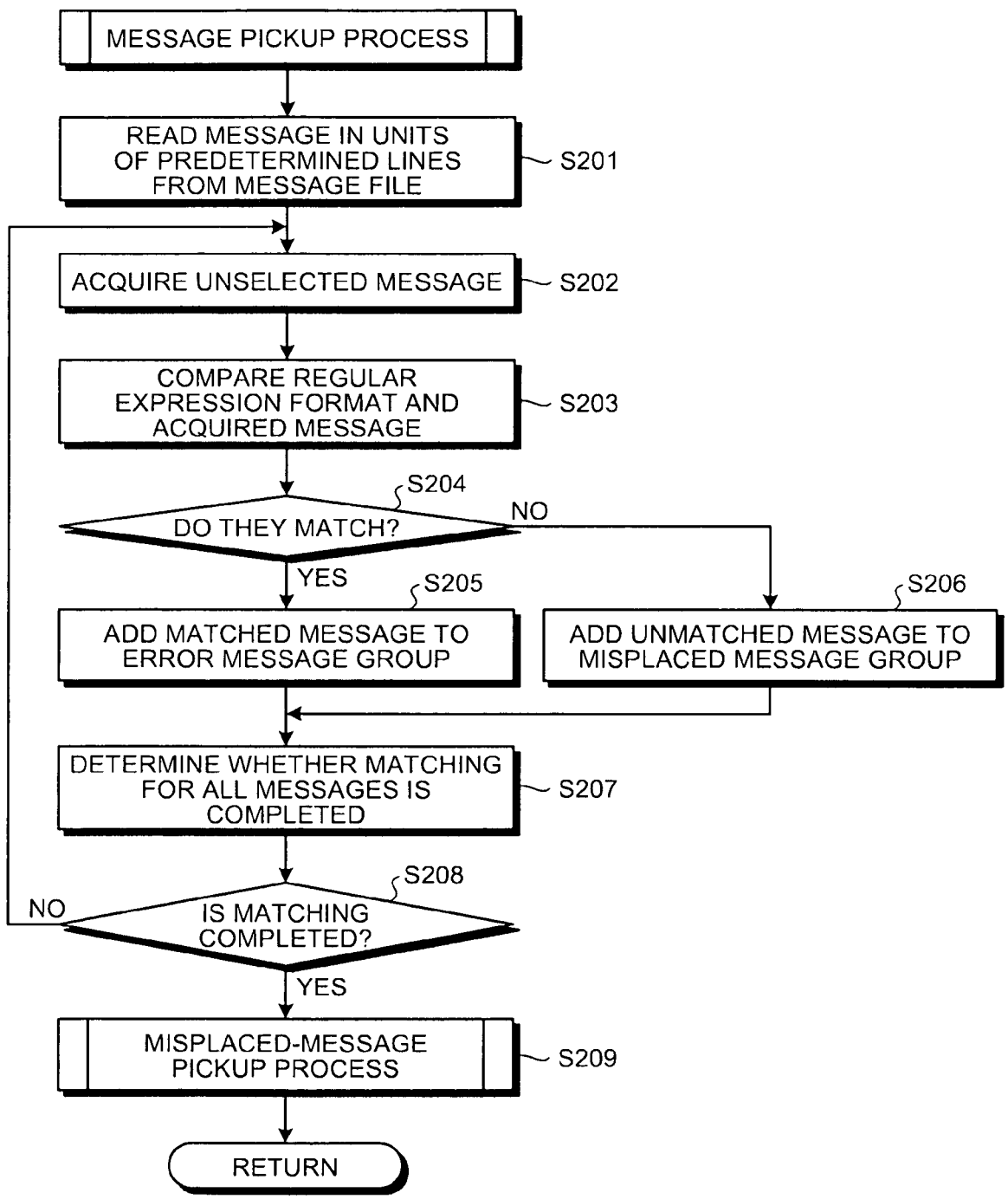
FIG. 15 is a flowchart of a message pickup process at step S103 in FIG. 14.

FIG. 15 is a flowchart of the message pickup process at step S103 shown in FIG. 14. As shown in FIG. 15, the pickup unit 120a reads messages in units of predetermined lines from the message file (step S201), to acquires an unselected message (step S202).

The pickup unit 120a compares the regular expression format and the acquired message (step S203). When the regular expression format and the acquired message match (step S204, Yes), the pickup unit 120a adds the matched message to an error message group (step S205), and determines whether matching for all messages has been finished (step S207). When the regular expression format and the acquired message do not match (step S204, No), the pickup unit 120a adds the unmatched message to a misplaced message group (step S206) of misplaced messages as detailed later, and the process proceeds to step S207.

When the pickup unit 120a determines whether matching for all messages has been finished and the matching for all messages is not completed (step S208, No), the process proceeds to step S202. When the matching for all messages is completed (step S208, Yes), the pickup unit 120a performs a misplaced-message pickup process (step S209).

For the message pickup process, any method may be adopted of extracting a message having the format conforming to the regular expression format from the message file. However, in message extraction, care should be taken on misplaced messages as described in the following.

FIG. 6 is an explanatory diagram for explaining a misplaced message. As shown in FIG. 6, normal messages M1 and M2 are separated from each other and thus cause no problem. However, since one message (M1 in the example of FIG. 6) is mixed into another message (M2 in this example) in a misplaced message, the pickup unit 120a has to perform an extracting process based on misplaced message considerations after the normal extracting process.

Figure 16:
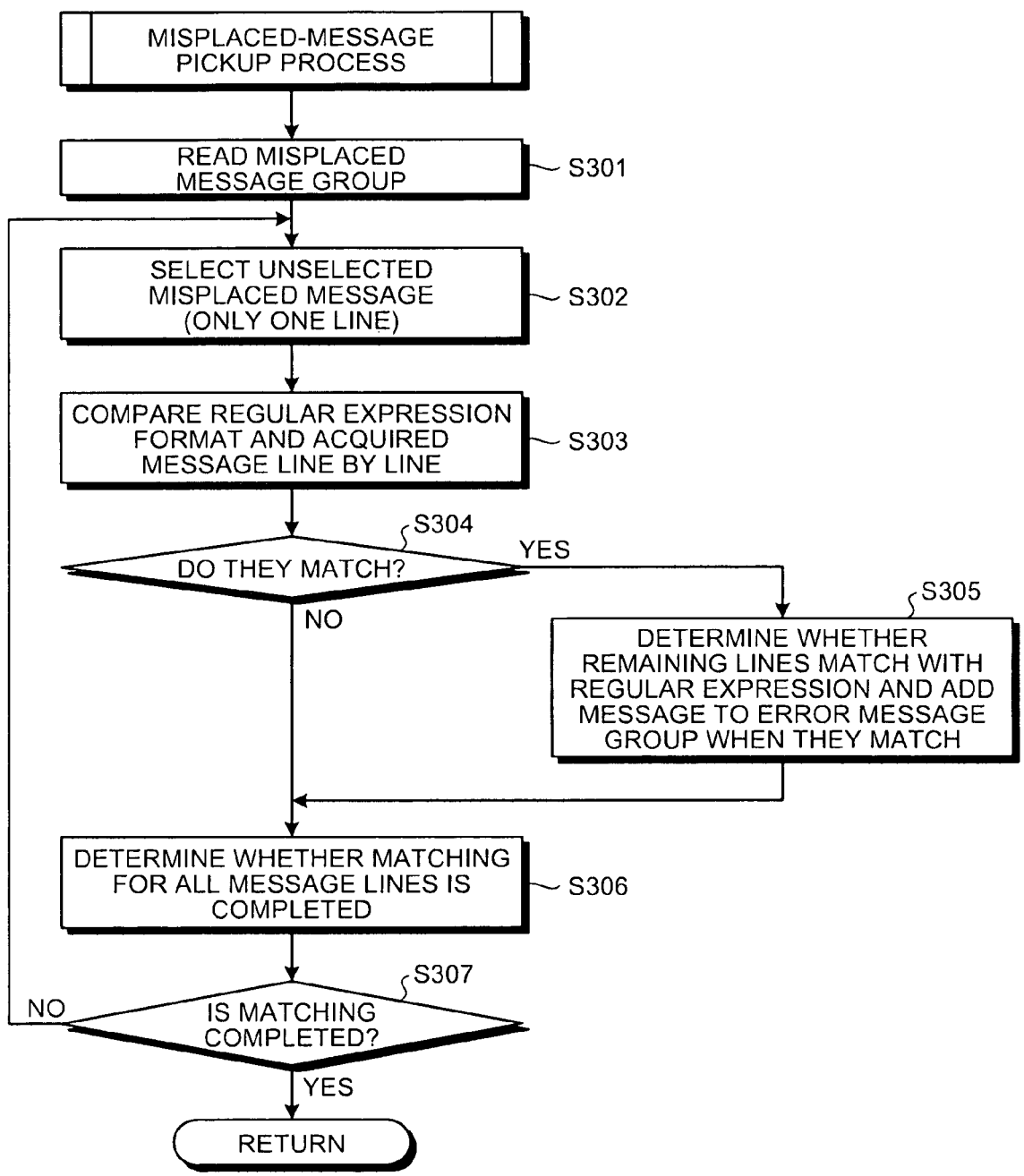
FIG. 16 is a flowchart of a misplaced-message pickup process at step S209 in FIG. 15.

The misplaced-message pickup process at step S209 shown in FIG. 15 is explained. FIG. 16 is a flowchart of the misplaced-message pickup process at step S209 shown in FIG. 15. As shown in FIG. 16, the pickup unit 120a reads the misplaced message group (step S301) and selects an unselected misplaced message (only one line) (step S302).

Subsequently, the pickup unit 120a compares the regular expression format and the acquired message line by line (step S303). When the regular expression format and the acquired message line match (step S304, Yes), the pickup unit 120a determines whether the remaining lines match the regular expression format. When the remaining lines match the regular expression format, the pickup unit 120a adds the message to the error message group (step S305), and determines whether matching for all message lines is completed (step S306). When the regular expression format and the acquired message do not match (step S304, No), the process proceeds directly to step S306.

When matching for all message lines is not completed (step S307, No), the process proceeds to step S302. When matching for all message lines is completed (step S307, Yes), the pickup unit 120a terminates the misplaced-message pickup process.

The pickup unit 120a narrows down a large amount of messages included in the message file only to necessary messages (error message group) as described above. Therefore, the error occurrence state in the computer can be determined efficiently.

Figure 17:
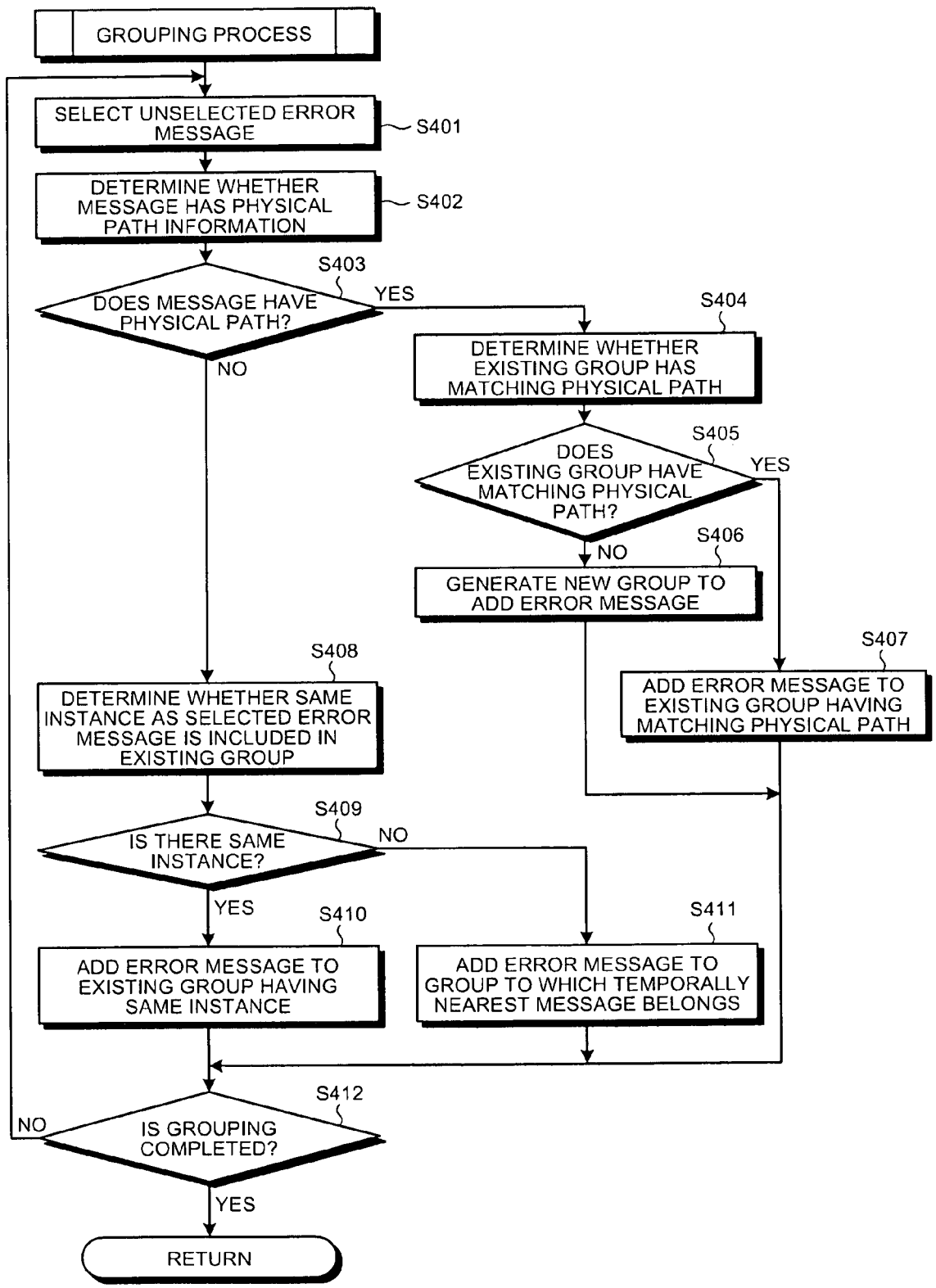
FIG. 17 is a flowchart of a grouping process at step S104 in FIG. 14.

The grouping process at step S104 shown in FIG. 14 is explained. FIG. 17 is a flowchart of the grouping process at step S104 shown in FIG. 14. As shown in FIG. 17, the grouping unit 120b selects an unselected error message (step S401) and determines whether the selected error message has physical path information (step S402).

When the selected error message has a physical path (step S403, Yes), the grouping unit 120b determines whether the existing group has a matching physical path (step S404). When the existing group does not have a matching physical path (step S405, No), the grouping unit 120b generates a new group to add the error message to the generated group (step S406), and the process proceeds to step S412.

When the existing group has a matching physical path (step S405, Yes), the grouping unit 120b adds the error message to the existing group having the matching physical path (step S407), and the process proceeds to step S412.

When the selected message does not have a physical path (step S403, No), the grouping unit 120b determines whether the same instance as the selected error message is included in the existing group (step S408). When the same instance is included (step S409, Yes), the grouping unit 120b adds the error message to the existing group having the same instance (step S410). When the grouping is not completed (step S412, No), the process proceeds to step S401. When the grouping is completed (step S412, Yes), the grouping unit 120b terminates the grouping process.

When the same instance as the selected error message is not included in the existing group (step S409, No), the grouping unit 120b adds the error message to a group to which a temporally nearest message belongs (step S411), and the process proceeds to step S412.

As described above, because the grouping unit 120b divides messages located separately into groups that are physically associated with each other, the error occurrence state in the computer can be analyzed efficiently.

Figure 18:
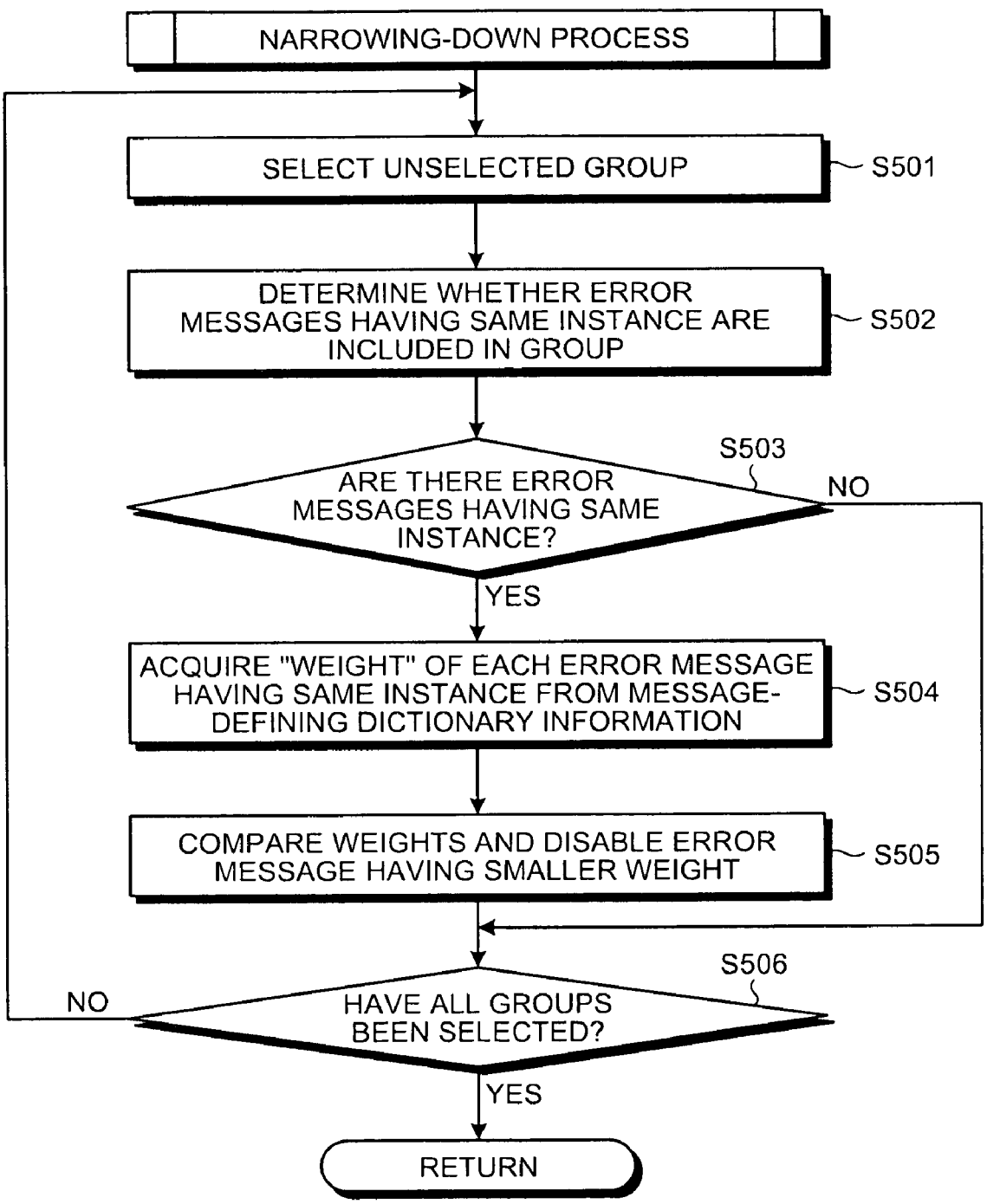
FIG. 18 is a flowchart of a narrowing-down process at step S105 in FIG. 14.

The narrowing-down process at step S105 shown in FIG. 14 is explained. FIG. 18 is a flowchart of the narrowing-down process at step S105 shown in FIG. 14. As shown in FIG. 18, the narrowing down unit 120c selects an unselected group (step S501), and determines whether error messages having an identical instance are included in the group (step S502).

When error messages having an identical instance are included (step S503, Yes), the narrowing down unit 120c acquires the weight of each of the error messages having an identical instance from the message-defining dictionary information (step S504), compares the weights, and disables an error message having a smaller weight (step S505). When not all groups have been selected (step S506, No), the process proceeds to step S501. When all groups have been selected (step S506, Yes), the narrowing down unit 120c terminates the narrowing-down process.

When no error message in the group have the same instance (step S503, No), the process proceeds directly to step S506.

In this way, the narrowing down unit 120c narrows down plural error messages having an identical instance to one. Therefore, the status of each instance can be determined with high accuracy.

Figure 19:
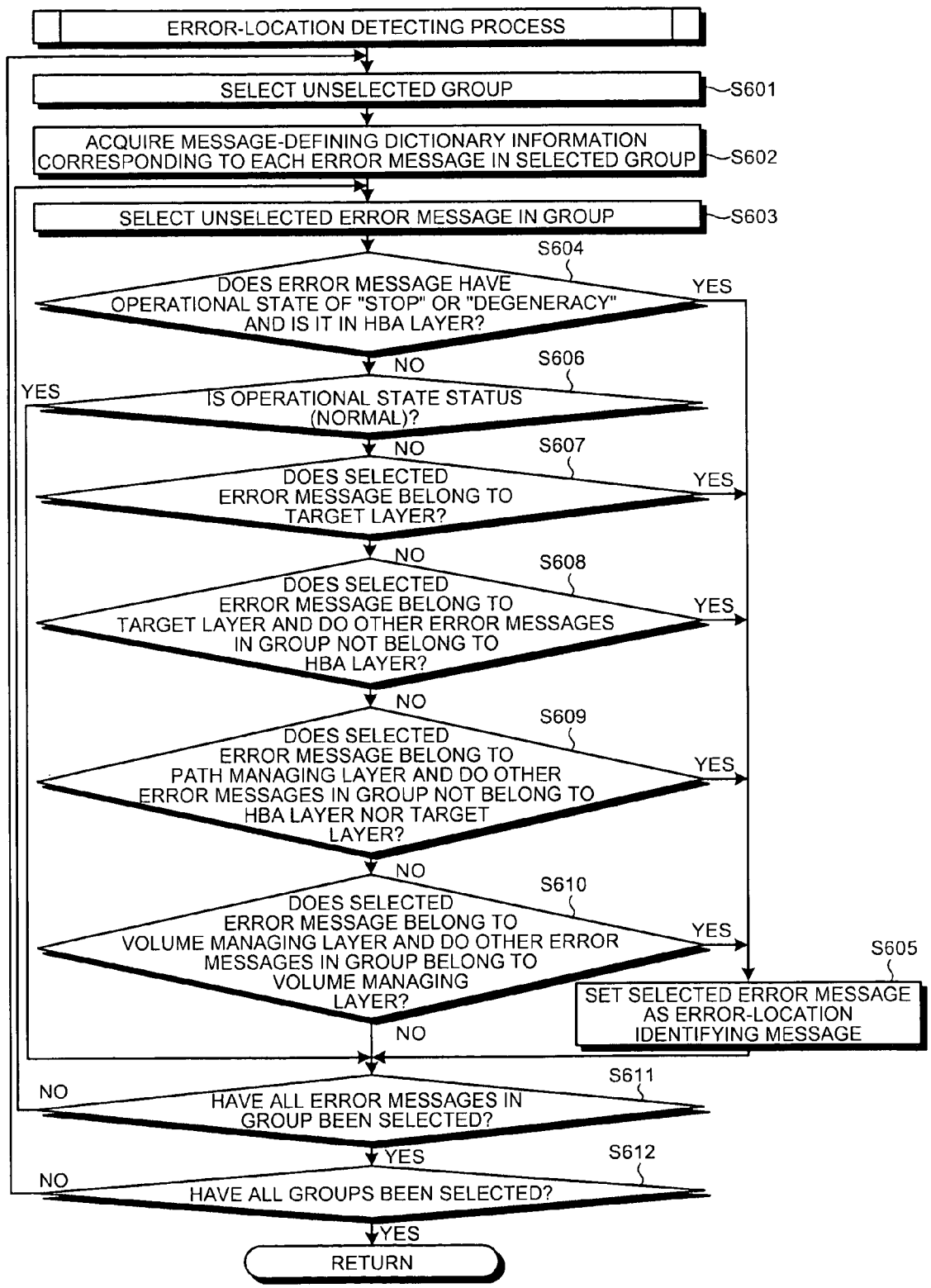
FIG. 19 is a flowchart of an error-location detecting process at step S106 in FIG. 14.

The error-location detecting process at step S106 shown in FIG. 14 is explained. FIG. 19 is a flowchart of the error-location detecting process at step S106 shown in FIG. 14. As shown in FIG. 19, the error-location detecting/identifying unit 120d selects an unselected group (step S601), and acquires message-defining dictionary information corresponding to error messages in the selected group (step S602).

Subsequently, the error-location detecting/identifying unit 120d selects an unselected error message in the group (step S603). When the selected error message has an operational state of "STOP" or "DEGENERACY" (step S604, Yes), the unit 120d makes a test to see if the selected error message is in the HBA layer in step S645. If so, then the error-location detecting/identifying unit 120d sets the selected error message as an error-location identifying message (step S605), and proceeds to step S611.

If the selected error message does not have an operation state of "STOP" or "DEGENERACY" (step S604, No), the error-location detecting/identifying unit 120d determines whether the operational state is normal (step S606). When the operational state is normal (step 606, Yes), the process proceeds to step S611.

If the operational state is not normal (step S606, No) or if the error message is not in the HBA layer (step S645, No), the error-location detecting/identifying unit 120d determines whether the selected error message belongs to a target layer (step S607). When the selected error message belongs to the target layer (step S607, Yes), the process proceeds to step S605.

When the selected error message does not belong to the target layer (step S607, No), the error-location detecting/identifying unit 120d determines whether the selected error message belongs to the path managing layer and the other error messages in the group do not belong to the HBA layer nor the target layer (step S609).

When the selected error message belong to the path managing layer and the other error messages in the group do not belong to the HBA layer nor the target layer (step S609, Yes), the process proceeds to step S605.

When the conditions at step S609 are not satisfied (step S609, No), the error-location detecting/identifying unit 120d determines whether the selected error message belongs to the volume managing layer and the other error messages in the group belong to the volume managing layer (step S610).

When the selected error message belongs to the volume managing layer and the other error messages in the group belong to the volume managing layer (step S610, Yes), the process proceeds to step S605.

When the conditions at step S610 are not satisfied (step S610, No), the error-location detecting/identifying unit 120d determines whether all error messages in the group have been selected (step S611). When not all error messages in the group have been selected (step S611, No), the process proceeds to step S603. When all error messages in the group have been selected (step S611, Yes), the error-location detecting/identifying unit 120d determines whether all groups have been selected (step S612).

When not all groups have been selected (step S612, No), the process proceeds to step S601. When all groups have been selected (step S612, Yes), the error-location detecting/identifying unit 120d terminates the error-location detecting process.

The error-location detecting/identifying unit 120d selects an error-location identifying message based on the operational state and the layer of each error message. Therefore, the error location in the computer can be identified accurately.

Figure 20:
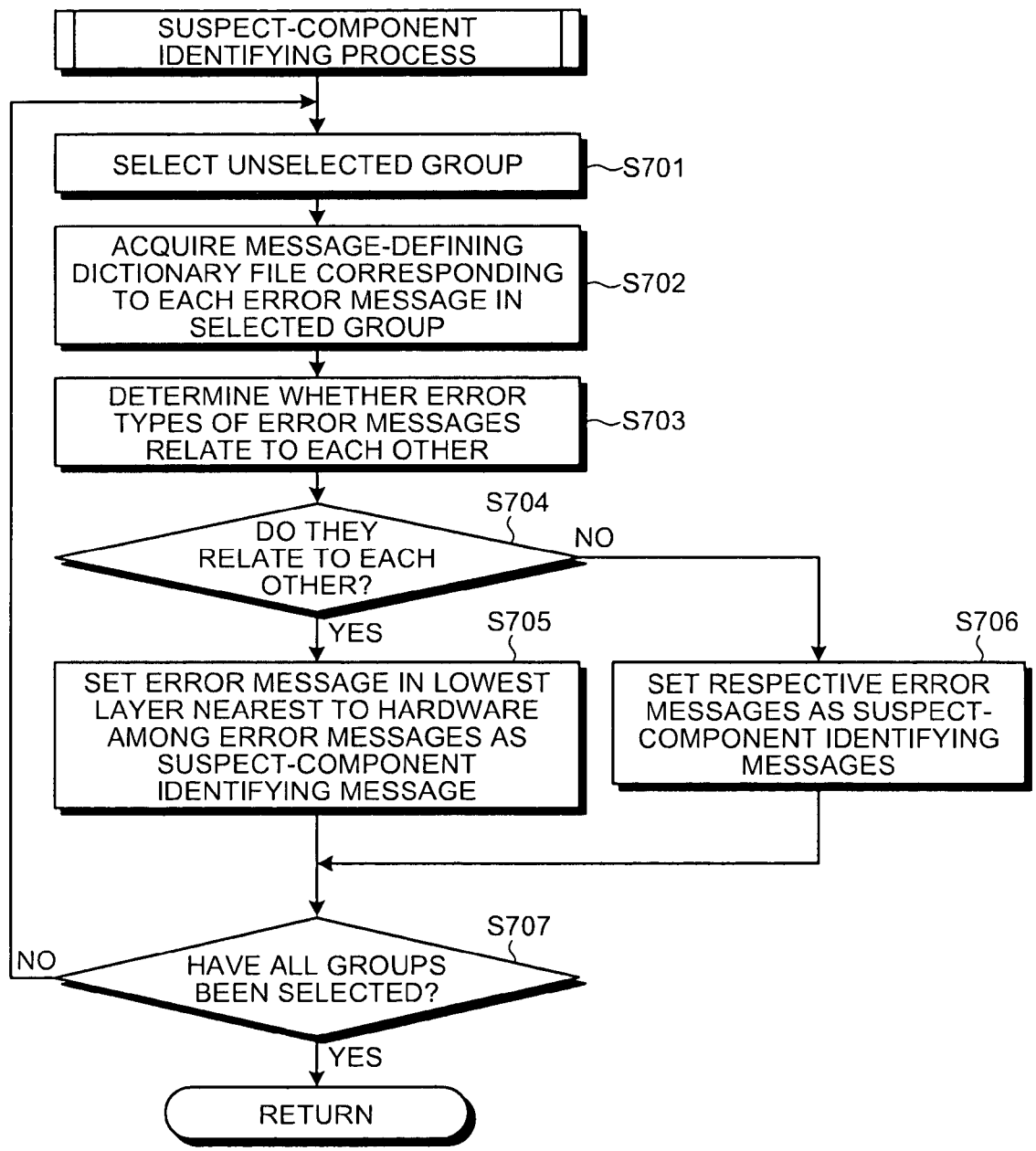
FIG. 20 is a flowchart of a suspect-component identifying process at step S107 in FIG. 14.

The suspect-component identifying process at step S107 shown in FIG. 14 is explained. FIG. 20 is a flowchart of the suspect-component identifying process at step S107 shown in FIG. 14. As shown in FIG. 20, the suspect-component identifying unit 120e selects an unselected group (step S701), and acquires a message-defining dictionary file corresponding to each error message in the selected group (step S702).

The suspect-component identifying unit 120e determines whether the error types of the error messages relate to each other (step S703). When the error types of the error messages relate to each other (step S704, Yes), the suspect-component identifying unit 120e sets an error message in the lowest layer among the respective error messages, that is nearest to hardware for the suspect-component identifying message (step S705). When all groups have not been selected (step S707, No), the process proceeds to step S701.

When the error types of the error messages do not relate to each other (step S704, No), the suspect-component identifying unit 120e sets the respective error messages as the suspect-component identifying messages (step S706), and the process proceeds to step S707.

As described above, when the error types of the error messages relate to each other, the suspect-component identifying unit 120e sets an error message that belongs to a lowest layer nearest to hardware, among the error messages, as the suspect-component identifying message. Therefore, a failed component can be identified with high accuracy.

Figure 21:
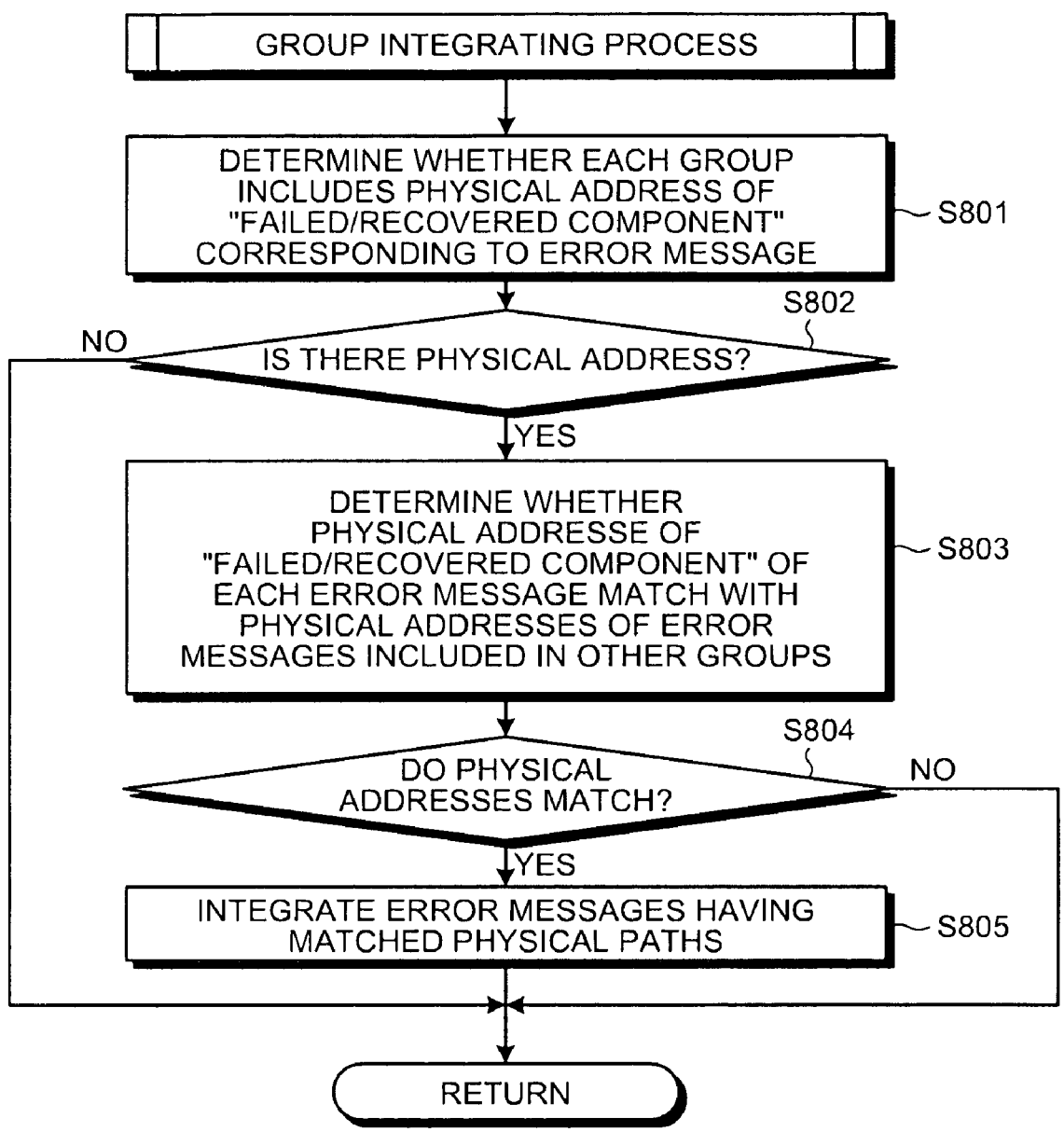
FIG. 21 is a flowchart of a group integrating process at step S108 shown in FIG. 14.

The group integrating process at step S108 shown in FIG. 14 is explained. FIG. 21 is a flowchart of the group integrating process at step S108 shown in FIG. 14. As shown in FIG. 21, the group integrating unit 120f determines whether each group includes a physical address (error message of the managing system) of a "failed/recovered component" corresponding to an error message of a managing system (step S801).

When the physical address of a "failed/recovered component" is included (step S802, Yes), the group integrating unit 120f determines whether the physical address of a "failed/recovered component" of each error message match with physical addresses of error messages included in other groups (step S803). When the physical addresses match (step S804, Yes), the group integrating unit 120f integrates the error messages having the matched physical paths (step S805). When the physical addresses do no match (step S804, No), the group integrating unit 120f terminates the group integrating process. When no physical address of a "failed/recovered component" is included (step S802, No), the group integrating unit 120f terminates the group integrating process.

The group integrating unit 120f integrates error groups that are associated physically in this way. Therefore, messages can be seen in units of operation of the system, which facilitates to know the operational state.

Figure 22:
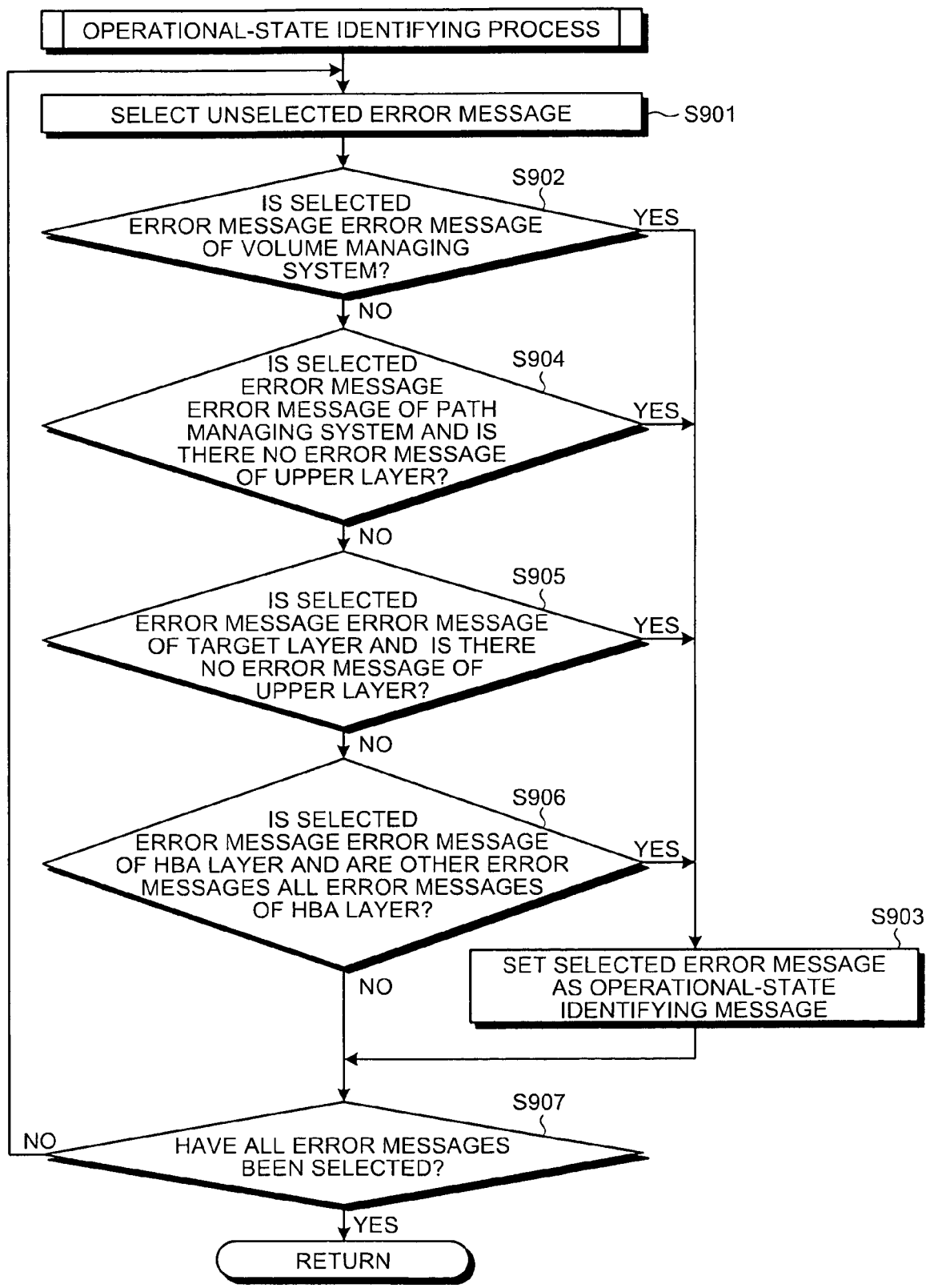
FIG. 22 is a flowchart of an operational-state identifying process at step S109 shown in FIG. 14.

The operational-state identifying process at step S109 shown in FIG. 14 is explained. FIG. 22 is a flowchart of the operational-state identifying process at step S109 shown in FIG. 14. As shown in FIG. 22, the operational-state identifying unit 120g selects an unselected error message (step S901). When the selected error message is an error message of the volume managing system, the operational-state identifying unit 120g sets the selected error message as the operational-state identifying message (step S903), and the process proceeds to step S907.

When the selected error message is not an error message of the volume managing system (volume managing layer) (step S902, No), the operational-state identifying unit 120g determines whether the selected error message is an error message of a path managing system (step S904).

When the selected error message is not an error message of the path managing system (step S904, No), the operational-state identifying unit 120g further determines whether the selected error message is an error message of the target layer (step S905).

When the selected error message is an error message of the path managing system (step S904, Yes) or of the target layer (step S905, Yes), the operational-state identifying unit 120g further determines whether there is any error message of a layer higher than the path managing system or the target layer, respectively (step S945). If not (step S945, No), the process proceeds to step S903.

If the selected error message is of neither the path managing system (step S904, No) nor the target layer (step S905, No) or if any error message of a layer higher than the path managing system or the target layer is found (step S945, Yes), then the operational-state identifying unit 120g determines whether the selected error message is an error message of the HBA layer and the other error messages are all error messages of the HBA layer (step S906).

When the selected error message is an error message of the HBA layer and the other error messages are all error messages of the HBA layer (step S906, Yes), the process proceeds to step S903. When the conditions at step S906 are not satisfied (step S906, No), the operational-state identifying unit 120g determines whether all error messages have been selected (step S907).

When not all error messages have been selected (step S907, No), the process proceeds to step S901. When all error messages have been selected (step S907, Yes), the operational-state identifying unit 120g terminates the operational-state identifying process.

The operational-state identifying unit 120g selects an error message belonging to the highest layer among the error messages, and sets the selected error message as the operational-state identifying message. Therefore, the operational state of the computer can be determined accurately.

As described above, in the message analyzing apparatus 100 according to the embodiment, the engine unit 120 acquires a message file from the input device 200, the pickup unit 120a extracts an error message group 400, the grouping unit 120b groups the error message group according to physical paths, the narrowing down unit 120c narrows down the error message group 400, the error-location detecting/identifying unit 120d selects an error-location identifying message, the suspect-component identifying unit 120e selects a suspect-component identifying message, the group integrating unit 120f integrates plural groups, the operational-state identifying unit 120g selects an operational-state identifying message, and the output unit 120h outputs a message analysis result to the display device 300. Therefore, the burden on the administrator can be lessened and the state of the computer can be determined efficiently in consideration of correlation among error messages.

The message analyzing apparatus according to the present invention determines a state of a computer by comparing plural messages with each other, which messages are generated by each of software managing hardware that constitutes the computer. Therefore, the burden on the administrator can be lessened, and the state of the computer in consideration of the correlation among error messages (hardware having trouble or an operational state of the computer) can be efficiently determined.

What is claimed is:

1. A computer readable media tangibly embodying a program comprising a set instructions which when executed performs a message analyzing method that analyzes a plurality of messages related to a state of hardware that constitutes a computer, the messages being generated respectively by pieces of software managing the hardware, the message analyzing method executed by the set of instructions comprising:

storing message-defining-dictionary information of an error message that indicates contents of the error message in association with a format of the error message;

extracting error messages having the format of the error message from the plurality of messages;

identifying error messages having identical instance information from among the extracted error messages, the instance information indicating a correspondence between the pieces of software generating the extracted error messages and the hardware; and selecting an error message having a highest priority based on a weighting included in the message-defining-dictionary information of the identified error messages.

2. The computer readable media according to claim 1, further comprising:

identifying an error location based on operational state information included in the message-defining-dictionary information of the selected error message.

3. A message analyzing apparatus that analyzes a plurality of messages related to a state of hardware that constitutes a computer, the messages being generated respectively by pieces of software managing the hardware, the message analyzing apparatus comprising:

a storing unit that stores message-defining-dictionary information of an error message that indicates contents of the error message in association with a format of the error messages;

an extracting unit that extracts error messages having the format of the error message from the plurality of messages; and a selecting unit that identifies error messages having identical instance information from among the extracted error messages, the instance information indicating a correspondence between the pieces of software generating the extracted error messages and the hardware, and selects an error message having a highest priority based on a weighting included in the message-defining-dictionary information of the identified error messages.

4. The message analyzing apparatus according to claim 3, further comprising a error-location identifying unit that identifies an error location based on operational state information included in the message-defining-dictionary information of the selected error message.

5. The message analyzing apparatus according to claim 3, further comprising a grouping unit that groups the extracted error messages according to physical paths of the extracted error messages to form a plurality of groups, wherein the selecting unit that identifies error messages having the identical instance information from among the extracted error messages in each of the groups, and selects an error message having a highest priority based on the weighting.

6. The message analyzing apparatus according to claim 3, further comprising a suspect-component identifying unit that identifies a suspect component based on suspect component information included in the message-defining-dictionary information of the selected error message.

7. The message analyzing apparatus according to claim 3, wherein the selecting unit that selects a plurality of error messages each having a highest priority in each group of the error messages for every instance information;

the suspect-component identifying unit that combines error messages corresponding to error type information included in the message-defining-dictionary information of the selected error messages, and identifies the suspect component based on the suspect component information included in the message-defining-dictionary information of the combined error message.

8. The message analyzing apparatus according to claim 5, further comprising:

a group integrating unit that obtains instance information included in the message-defining-dictionary information of the selected error message and integrates the selected error messages corresponding to the instance information between the groups; and a operational-state identifying unit that identifies a operational-state based on operational state information included in the message-defining-dictionary information of the integrated error message.

9. A message analyzing method that analyzes a plurality of messages related to a state of hardware that constitutes a computer, the messages being generated respectively by pieces of software managing the hardware, the message analyzing method comprising:

storing message-defining-dictionary information of an error message that indicates contents of the error message in association with a format of the error message;

extracting error messages having the format of the error message from the plurality of messages;

identifying error messages having identical instance information from among the extracted error messages, the instance information indicating a correspondence between the pieces of software generating the extracted error messages and the hardware; and selecting an error message having a highest priority based on a weighting included in the message-defining-dictionary information of the identified error messages.

10. The message analyzing method according to claim 9, further comprising:

identifying an error location based on operational state information included in the message-defining-dictionary information of the selected error message.

* * * * *